(12) United States Patent
Hanafusa

(10) Patent No.: US 11,385,251 B2
(45) Date of Patent: Jul. 12, 2022

(54) PRETREATMENT METHOD FOR SPECIMEN HELD IN MICROCHANNEL, PRETREATMENT APPARATUS FOR PERFORMING PRETREAT METHOD, AND ANALYSIS SYSTEM PROVIDED WITH PRETREATMENT APPARATUS

(71) Applicant: SHIMADZU CORPORATION, Kyoto (JP)

(72) Inventor: Nobuhiro Hanafusa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 72 days.

(21) Appl. No.: 16/263,758

(22) Filed: Jan. 31, 2019

(65) Prior Publication Data
US 2019/0234983 A1    Aug. 1, 2019

(30) Foreign Application Priority Data

Feb. 1, 2018    (JP) .............................. JP2018-016165

(51) Int. Cl.
*G01N 35/10*    (2006.01)
*G01N 35/04*    (2006.01)
(Continued)

(52) U.S. Cl.
CPC ........ *G01N 35/1002* (2013.01); *B01L 3/5021* (2013.01); *G01N 1/40* (2013.01);
(Continued)

(58) Field of Classification Search
CPC combination set(s) only.
See application file for complete search history.

(56) References Cited

U.S. PATENT DOCUMENTS

2011/0085950 A1*  4/2011  Lee .................. G01N 35/00029
                                                422/504
2011/0157580 A1    6/2011  Nogami et al.
(Continued)

FOREIGN PATENT DOCUMENTS

CA       1266420 A     3/1990
CN     106537138 A     3/2017
(Continued)

OTHER PUBLICATIONS

Extended European Search Report dated Jul. 25, 2019 issued by the European Patent Office in counterpart application No. 19154681.1.
(Continued)

*Primary Examiner* — Samuel P Siefke
*Assistant Examiner* — Tingchen Shi
(74) *Attorney, Agent, or Firm* — Sughrue Mion, PLLC

(57) ABSTRACT

A pretreatment apparatus includes a pretreatment container placement section where a pretreatment container which is housing a specimen holding member including a microchannel for holding a specimen is placed; a carrying mechanism for carrying the pretreatment container that is placed at the pretreatment container placement section; and a pretreatment section including a port where the pretreatment container that is carried by the carrying mechanism is placed, the pretreatment section being configured to perform pretreatment including a shaking process of shaking the pretreatment container to extract the specimen from the specimen holding member in the pretreatment container that is placed in the port.

7 Claims, 17 Drawing Sheets

(51) Int. Cl.
    *B01L 3/00*         (2006.01)
    *G01N 1/40*         (2006.01)
    *G01N 35/00*       (2006.01)
    *G01N 35/08*       (2006.01)

(52) U.S. Cl.
    CPC ....... *G01N 35/00584* (2013.01); *G01N 35/04* (2013.01); *G01N 35/08* (2013.01); *B01L 2200/0605* (2013.01); *B01L 2300/0681* (2013.01); *B01L 2300/0838* (2013.01); *B01L 2400/0409* (2013.01); *B01L 2400/0433* (2013.01); *G01N 2035/00495* (2013.01); *G01N 2035/0441* (2013.01); *G01N 2035/0443* (2013.01); *G01N 2035/0449* (2013.01); *G01N 2035/0453* (2013.01)

(56) References Cited

U.S. PATENT DOCUMENTS

| | | | |
|---|---|---|---|
| 2016/0228876 A1* | 8/2016 | Chu | G01N 21/6486 |
| 2017/0113217 A1* | 4/2017 | Ledden | A61B 5/150022 |
| 2017/0120259 A1 | 5/2017 | Takeuchi et al. | |
| 2017/0168027 A1 | 6/2017 | Hanafusa et al. | |

FOREIGN PATENT DOCUMENTS

| | | | | |
|---|---|---|---|---|
| EP | 3171151 A1 | 5/2017 | | |
| EP | 3176576 A1 | 6/2017 | | |
| JP | 60-238760 A | 11/1985 | | |
| JP | 2003-98181 A | 4/2003 | | |
| JP | 2009-014450 A | 1/2009 | | |
| JP | 2010-060474 A | 3/2010 | | |
| JP | 2016-170079 A | 9/2016 | | |
| JP | 2016170079 A * | 9/2016 | | |
| WO | WO-2012058632 A1 * | 5/2012 | ............. | G01N 30/72 |
| WO | 2016/009720 A1 | 1/2016 | | |
| WO | WO-2016002032 A1 * | 1/2016 | ............... | G01N 1/10 |
| WO | WO-2016009720 A1 * | 1/2016 | ........... | G01N 33/491 |
| WO | 2016/017042 A1 | 2/2016 | | |
| WO | WO-2016035140 A1 * | 3/2016 | ............. | G01N 35/02 |

OTHER PUBLICATIONS

Communication dated Mar. 22, 2021 from The State Intellectual Property Office of P.R. of China in Application No. 201811535033.0.
Communication dated Mar. 30, 2021 from the Japanese Patent Office in Application No. 2018-016165.
Communication dated Jan. 18, 2022 from the European Patent Office in European Application No. 19 154 681.1.
Communication dated Jan. 7, 2022 from the Chinese Patent Office in Chinese Application No. 201811535033.0.

* cited by examiner

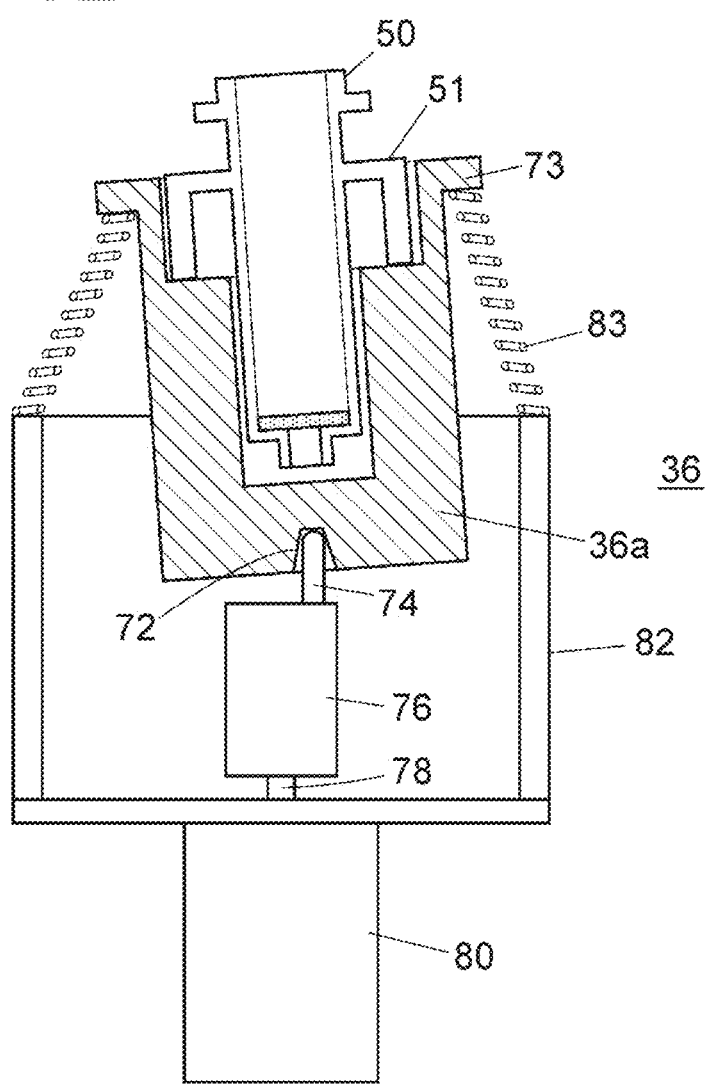

PRETREATMENT METHOD FOR SPECIMEN HELD IN MICROCHANNEL, PRETREATMENT APPARATUS FOR PERFORMING PRETREAT METHOD, AND ANALYSIS SYSTEM PROVIDED WITH PRETREATMENT APPARATUS

BACKGROUND OF THE INVENTION

1. Field of the Invention

The present invention relates to a pretreatment method for a biologically derived sample, such as whole blood, serum, plasma, dried blood spots or urine, that is held in a microchannel, a pretreatment apparatus for performing the pretreatment method, and an analysis system, provided with the pretreatment apparatus, for automatically performing a series of processes from pretreatment to analysis of the sample.

2. Description of the Related Art

When performing a quantitative analysis of a sample, such as a biological sample, a process of removing a specific component unnecessary for the analysis from the biological sample and extracting a necessary component as the sample, or a drying/solidifying process for concentrating or drying/solidifying the extracted sample may have to be performed. Various devices are conventionally proposed and implemented as a pretreatment apparatus for automatically performing such pretreatment processes (for example, see JP 2010-60474 A).

JP 2010-60474 A, for example, discloses holding, by a common carrying mechanism, a plurality of cartridges each holding a separation agent for dipping a sample and separating a specific component, sequentially placing, by the carrying mechanism, the cartridges in a pressure applying mechanism placed at a predetermined position, and extracting a sample by applying a pressure on the cartridge at the pressure applying mechanism. In this case, a plurality of extracted liquid receivers for receiving extracted liquids from the cartridges are moved relative to the cartridges by another carrying mechanism, below the cartridges, and are sequentially placed at the pressure applying mechanism, and extraction of samples are thereby successively performed.

However, with the method described above, the carrying mechanisms for the cartridges and the extracted liquid receivers cannot be moved while the pressure applying mechanism is performing an extraction process of a sample, and there is a limit to increasing a pretreatment efficiency. Accordingly, the present inventors propose to increase the pretreatment efficiency by carrying, in a random access manner, a set of a separation device including a filter for filtering a sample and a collection container for collecting an extracted sample from the separation device, to a port where processes such as a filtering process and a stirring process are performed (see WO 2016/017042 A1 and JP 2016-170079 A).

SUMMARY OF THE INVENTION

A microsampling device for sampling a very small amount of specimen is proposed and implemented (see WO 2016/009720 A1). The microsampling device sucks in a specimen from an inlet by using a capillary force, and holds the specimen in a microchannel that is provided inside.

A part of the microchannel of the microsampling device disclosed in WO 2016/009720 A1 can be cut off, and a specific amount of specimen may thereby be extracted with high reproducibility. When analyzing a specimen held in the microchannel, the specimen has to be extracted from the microchannel into another container, and a predetermined pretreatment process has to be performed.

As a method for extracting a specimen held in a microchannel, a method of injecting a liquid such as pure water into the microchannel from one end of the microchannel by using a needle or the like, and extracting a specimen from the other side of the microchannel may be cited. However, since such a method has to be manually performed by an analyst, errors and variations tend to occur, and reproducibility of pretreatment process and analysis is reduced.

Accordingly, the present invention has its object to enable a pretreatment process of a specimen that is held in a microchannel to be performed with high reproducibility.

A pretreatment method according to the present invention is a pretreatment method for a specimen that is held in a specimen holding member including a microchannel for holding the specimen. For example, the specimen holding member is a piece cut off from a microsampling device including the microchannel that sucks in a specimen from one end side and holds the specimen. The pretreatment method includes the steps of housing the specimen holding member in a container, shaking the container which is housing the specimen holding member in such a way that a centrifugal force acts on the specimen held in the microchannel of the specimen holding member so that the specimen is extracted from the specimen holding member into the specimen container, and performing predetermined pretreatment on the specimen extracted from the specimen holding member into the container, where the steps are performed in such an order.

As the specimen to be held in the specimen holding member, biologically derived specimens, such as whole blood, serum, urine and saliva, may be cited.

A pretreatment apparatus according to the present invention includes a pretreatment container placement section where a pretreatment container which is housing a specimen holding member including a microchannel for holding a specimen is placed, a carrying mechanism for carrying the pretreatment container placed at the pretreatment container placement section, and a pretreatment section including a port where the pretreatment container carried by the carrying mechanism is placed, the pretreatment section being configured to perform pretreatment including a shaking process of shaking the pretreatment container to extract the specimen from the specimen holding member in the pretreatment container that is placed in the port. That is, the pretreatment apparatus of the present invention may extract a specimen from the microchannel by carrying the pretreatment container which is housing the specimen holding member holding the specimen to the pretreatment section by the carrying mechanism, and by shaking the pretreatment container at the pretreatment section.

In the pretreatment apparatus of the present invention, preferably, the pretreatment container placement section is for placing an empty pretreatment container that does not contain a specimen, and the pretreatment apparatus further comprises a specimen placing section where a specimen container containing a specimen is placed separately from the pretreatment container, a specimen dispensing section configured to collect the specimen from the specimen container that is placed at the specimen placing section, to dispense the collected specimen into the empty pretreatment container placed at a predetermined dispensing position, and a specimen identification section configured to identify whether an analysis target specimen is the specimen contained in the specimen container or the specimen held in the specimen holding member. This enables pretreatment to be performed not only on a specimen that is held in the specimen holding member, but also on a specimen that is placed in the specimen container. Additionally, for example, the specimen identification section may identify whether an analysis target specimen is a specimen that is contained in the specimen container or a specimen that is held in the specimen holding member, based on information about the specimen input by an analyst.

In a preferred aspect of the pretreatment apparatus of the present invention, the pretreatment apparatus further comprises a pretreatment operation section. The pretreatment operation section is configured to carry the empty pretreatment container placed at the pretreatment container placement section to the dispensing position by the carrying mechanism to dispense the analysis target specimen into the pretreatment container by the specimen dispensing section, to carry the pretreatment container to the pretreatment section, and to perform predetermined pretreatment, when the analysis target specimen is identified by the specimen identification section to be the specimen contained in the specimen container. Further, the pretreatment operation section is configured to carry the pretreatment container, which is housing the specimen holding member and placed at the pretreatment container placement section, to the pretreatment section by the carrying mechanism, and to perform predetermined pretreatment including the shaking process, when the analysis target specimen is identified by the specimen identification section to be the specimen held in the specimen holding member.

The pretreatment section preferably includes a plurality of shaking ports for performing the shaking process. In this case, the pretreatment operation section is configured to search for an available shaking port and carries a target pretreatment container to the available shaking port by the carrying mechanism, and to perform the shaking process, when the analysis target specimen is identified by the specimen identification section to be the specimen that is held in the specimen holding member. This allows the pretreatment container to be carried to a shaking port when there is an available shaking port, and an extraction process of the specimen from the specimen holding member may be performed in a random access manner, thus, a pretreatment efficiency is increased.

The pretreatment container placement section may be configured for placing a plurality of the pretreatment containers. In this case, there are preferably further included an information storing section for holding information about a position, at the pretreatment container placement section, where the pretreatment container which is housing the specimen holding member is placed, and a pretreatment container specifying section configured to specify the pretreatment container which is housing the specimen holding member holding the analysis target specimen based on the information stored by the information storing section, when the analysis target specimen is the specimen held in the specimen holding member. Then, if an analyst places the pretreatment container housing the specimen holding member, and registers an placing position in advance in the information storing section, the device automatically specifies the position of the pretreatment container housing the specimen holding member, and extraction of the specimen held in the specimen holding member and subsequent pretreatment are automatically performed.

An analysis system according to the present invention includes a pretreatment apparatus and a liquid chromatograph system. The pretreatment apparatus is the pretreatment apparatus according to the present invention described above, and includes a transfer apparatus including a transfer port where the pretreatment container containing a specimen that is previously subjected to pretreatment at the pretreatment section is placed by the carrying mechanism, the transfer apparatus being configured to transfer, to outside the pretreatment apparatus, a container that is placed in the transfer port, by moving the transfer port. The liquid chromatograph system is arranged adjacent to the pretreatment apparatus, and includes an analytical flow path where a mobile phase flows, a sample injection device for collecting a sample in the container that is moved to outside the pretreatment apparatus by the transfer apparatus, injecting the sample into the analytical flow path, an analytical column, arranged on the analytical flow path, for separating the sample injected by the sample injection device into each component, and a detector for detecting a sample component that is separated at the analytical column.

In the pretreatment method of the present invention, the specimen holding member including the microchannel holding a specimen is housed in the container, the specimen is extracted into the container by shaking the container, and then, predetermined pretreatment is performed. Therefore, a task of manually extracting the specimen using a needle or the like does not have to be performed, and a specimen may be extracted from the specimen holding member with high reproducibility. Pretreatment may thus be performed on a specimen that is held in the microchannel with high reproducibility.

In the pretreatment apparatus of the present invention, by simply placing the pretreatment container housing the specimen holding member holding a specimen in the microchannel at the pretreatment container placement section, the pretreatment container is carried to the pretreatment section and pretreatment including extraction of the specimen from the specimen holding member is automatically performed. Thus, errors and variations which are caused by manual operation of an analyst may be eliminated, and reproducibility of an analysis result may be increased.

In the analysis system of the present invention, after performing pretreatment of a specimen at the pretreatment apparatus described above, the specimen which has been subjected to the pretreatment may be automatically introduced into the liquid chromatograph system to be subjected to separation/analysis, and thus, a series of operations from pretreatment of a specimen sampled by a microsampling device to analysis thereof may be fully automatically performed without involving a person. Because a person is not involved, errors and variations caused by manual operation are eliminated, and reproducibility of an analysis result is increased.

BRIEF DESCRIPTION OF THE DRAWINGS

FIG. 6B is a cross-sectional structural view showing an operation state of the stirring section;

DETAILED DESCRIPTION OF THE INVENTION

Figure 1:
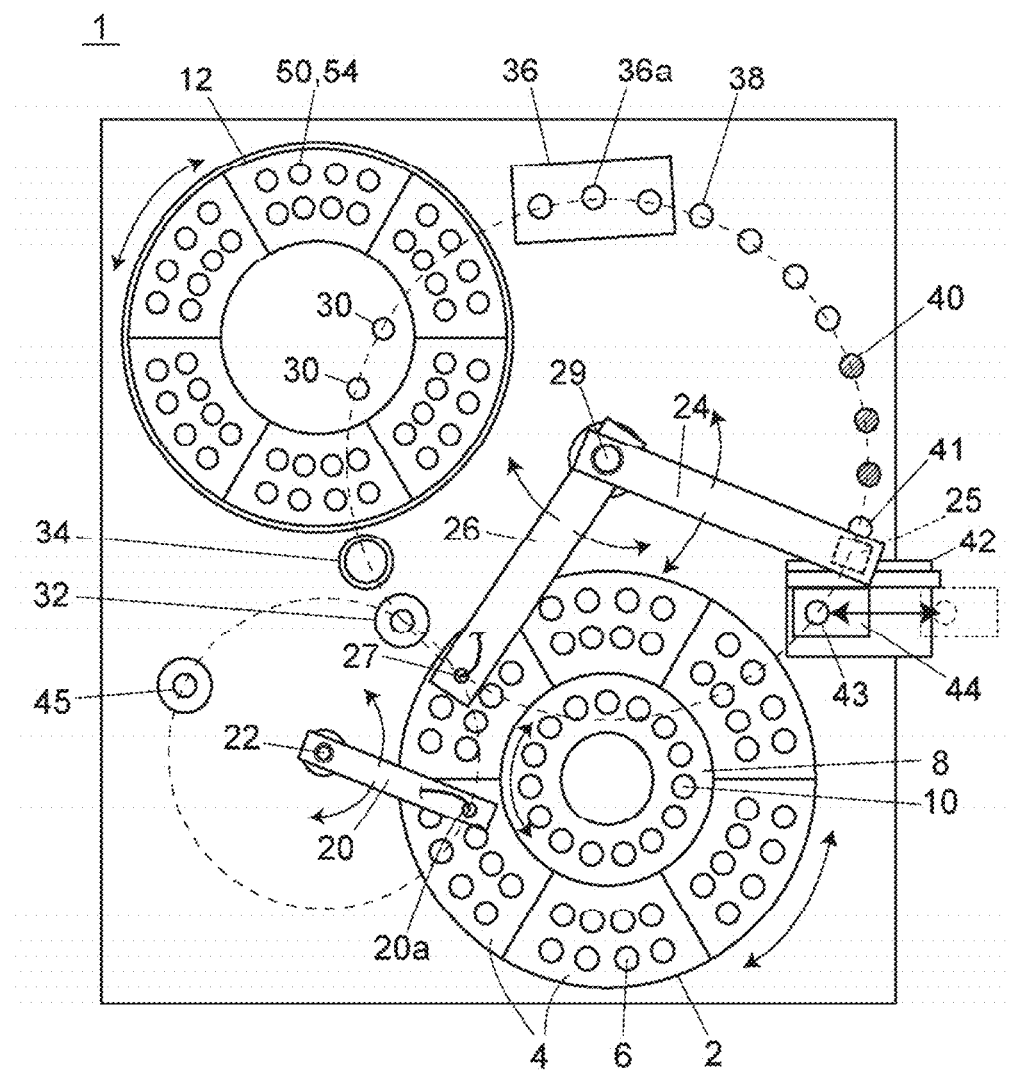
FIG. 1 is a plan view showing an embodiment of a pretreatment apparatus.

An embodiment of a pretreatment apparatus will be described with reference to FIG. 1.

A pretreatment apparatus 1 of the present embodiment performs necessary pretreatment items by using, for each specimen, a pretreatment container including one set of a separation device 50 and a collection container 54, which is prepared in advance. A plurality of processing ports for performing respective pretreatment items are provided in the pretreatment apparatus 1, and the pretreatment container containing a specimen is placed in one of the processing ports so that the pretreatment item corresponding to the processing port is performed on the specimen contained in the pretreatment container. A detailed description of each processing port will be given later. The pretreatment item is an item of pretreatment that is necessary for performing an analysis item specified by an analyst.

The separation device 50 and the collection container 54 forming the pretreatment container are carried by a carrying arm 24 forming a carrying mechanism. The carrying arm 24 includes, on a distal end side, a holding section 25 for holding the separation device 50 and the collection container 54, and rotates in a horizontal plane around a vertical shaft 29 holding a proximal end portion of the carrying arm 24 in such a way that the holding section 25 draws an arc-shaped trajectory. Each processing port and other ports, which are carrying destinations of the separation device 50 and the collection container 54, are all provided on the arc-shaped trajectory drawn by the holding section 25.

A specimen placing section 2 for placing a specimen container 6 containing a specimen is provided, and a sampling arm 20 as a specimen dispensing section for collecting a specimen from a specimen container placed in the specimen placing section 2 is provided nearby. Sample racks 4 for holding a plurality of specimen containers 6 are annularly placed at the specimen placing section 2. The specimen placing section 2 rotates in the horizontal plane to move the sample racks 4 in a circumferential direction, and a desired specimen container 6 is placed at a predetermined sampling position by the rotation of the specimen placing section 2. A sampling position is a position along a track of a sampling nozzle 20a at a distal end of the sampling arm 20, and is a position at which a specimen is collected by the sampling nozzle 20a.

A vertical shaft 22 penetrates a proximal end portion of the sampling arm 20, and the sampling arm 20 rotates in the horizontal plane around the shaft 22, and moves vertically along a vertical direction of the shaft 22. The sampling nozzle 20a is held at a distal end side of the sampling arm 20 with a distal end of the sampling nozzle 20a facing vertically downward, and the sampling nozzle 20a is moved by the sampling arm 20 to draw an arc-shaped trajectory in the horizontal plane and moves vertically along the vertical direction.

A dispensing port 32 is provided on the track of the sampling nozzle 20a, at a position on a track of the holding section 25 of the carrying arm 24. The dispensing port 32 is a port for the sampling nozzle 20a to dispense a specimen into an unused separation device 50. An unused separation device 50 is placed at the dispensing port 32 by the carrying arm 24. The dispensing port 32 is also used to add a reagent to the separation device 50 containing a specimen, or to add a reagent to the separation device 50 containing a solid sample described later.

A reagent placing section 8 for placing reagent containers 10 is provided on an inside of the specimen placing section 2, and a reagent arm 26 (reagent adding section) for collecting a reagent from a reagent container placed at the reagent placing section 8 is provided. The reagent arm 26 is supported at a proximal end by the vertical shaft 29 commonly used by the carrying arm 24, and rotates in the horizontal plane and also moves vertically. A probe 27 is provided at a distal end portion of the reagent arm 26. The probe 27 is provided with a distal end facing vertically downward, and moves in the horizontal plane while drawing the same arc-shaped trajectory as the holding section 25 of the carrying arm 24 and also moves vertically. A proximal end of the probe 27 is connected to a syringe pump for sucking and discharging liquid, and the probe 27 sucks in and discharges a reagent from the distal end.

The reagent placing section 8 rotates in the horizontal plane, independently of the specimen placing section 2. A plurality of reagent containers 10 are annularly placed at the reagent placing section 8, the reagent containers 10 are carried in a rotation direction when the reagent placing section 8 rotates, and a desired reagent container 10 is thereby placed at a predetermined reagent collecting position. A reagent collecting position is a position along a track of the probe 27 of the reagent arm 26, and is a position for collecting a reagent by the probe 27. After sucking in a predetermined reagent, the probe 27 dispenses the sucked-in reagent into the separation device 50 placed at the dispensing port 32 to thereby add the reagent to a specimen.

A pretreatment container placement section 12 is provided at a position different from the specimen placing section 2 and the reagent placing section 8. A plurality of pretreatment containers, which are each a set of unused separation device 50 and collection container 54 that are stacked, are annularly placed at the pretreatment container placement section 12. The pretreatment container placement section 12 moves the pretreatment containers in a circumferential direction by rotating in the horizontal plane, and places a pretreatment container, which is an arbitrary set, at a position along the track of the holding section 25 of the carrying arm 24. The carrying arm 24 is able to hold the unused separation device 50 or collection container 54 that is placed at a position along the track of the holding section 25.

An analyst may place, at the pretreatment container placement section 12, a plurality of types (such as two types) of separation devices 50 containing separation agents of different separation performances. These separation devices 50 are used according to sample analysis items, and a separation device 50 for an analysis item that is specified by an analyst is selected by the pretreatment container placement section 12. Selection of an appropriate separation device 50 is performed by a control unit controlling the operation of the pretreatment apparatus 1. A detailed description of the control unit will be given later. An analysis item here is a type of analysis that is to be sequentially performed on a sample on which pretreatment is performed at the pretreatment apparatus 1. As an analysis device for performing such analysis, for example, a liquid chromatograph (LC) or liquid chromatograph mass spectrometer (LC/MS) may be cited.

In the present embodiment, the pretreatment container formed of the collection container 54 and the separation device 50 housing a specimen holding member holding a specimen may be placed at the pretreatment container placement section 12. The specimen holding member is a member including a microchannel for holding a specimen, and may be, for example, a piece of a microsampling device.

Figure 3A:
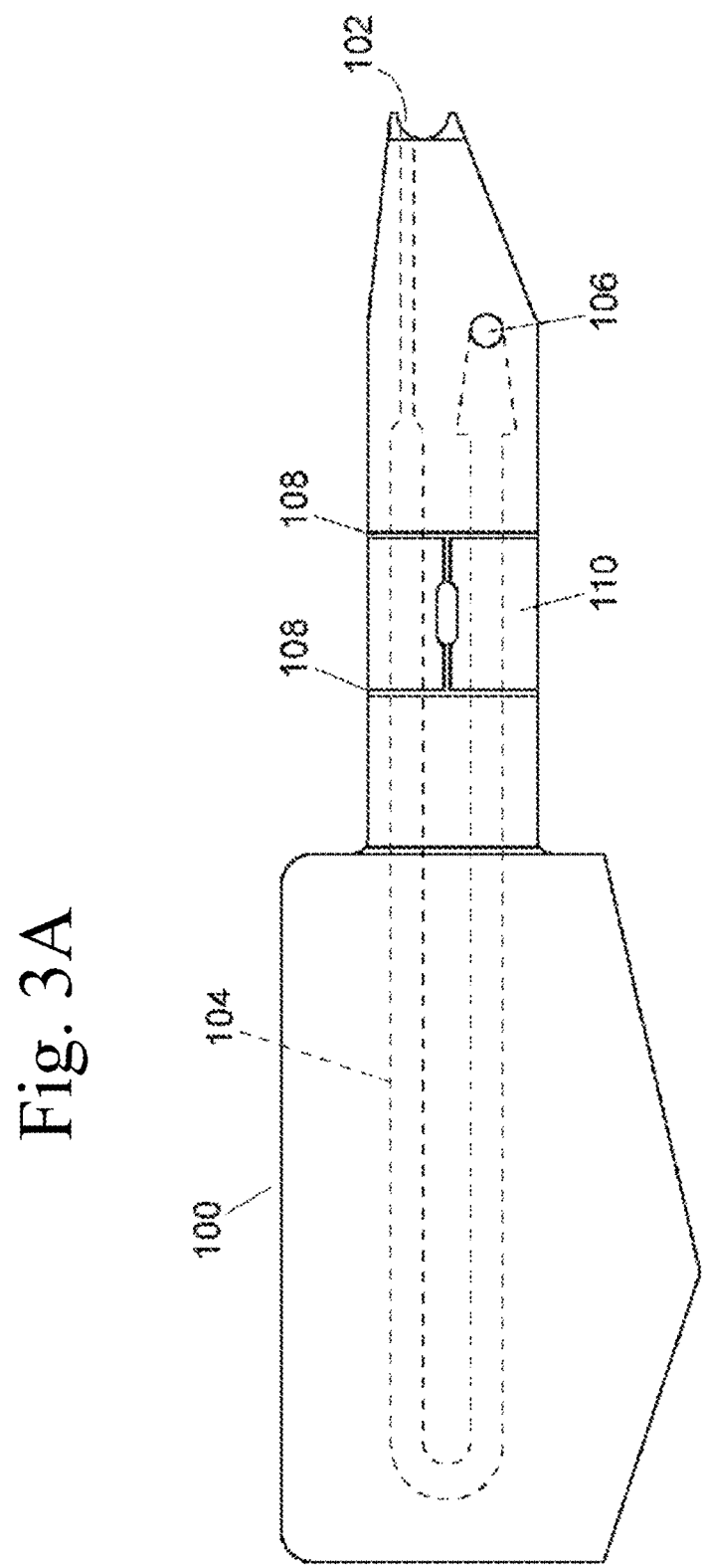
FIG. 3A is a plan view showing an example of a micro-sampling device.

An example of the microsampling device is shown in FIG. 3A. A microsampling device 100 shown in FIG. 3A is equivalent to the one disclosed in WO 2016/009720 A1, and includes an inlet 102 at a distal end portion and a substantially U-shaped microchannel 104 on an inside. One end of the microchannel 104 communicates with the inlet 102, and the other end communicates with an air hole 106. The microchannel 104 is formed to have a width by which a specimen is sucked into the microchannel 104 by a capillary force when the inlet 102 at the distal end portion of the microsampling device 100 is immersed in the specimen.

A cut-away part 108 for cutting off an extraction section 110, which is a piece on a distal end side, as the specimen holding member is provided on a surface of the microsampling device 100, and a specific amount of specimen held in the microchannel 104 may be extracted with high accuracy by cutting off the extraction section 110 along the cut-away part 108.

The microsampling device 100 may perform centrifugal separation of a specimen by turning the distal end portion where the inlet 102 is provided toward a rotation center direction in a state where the specimen is held in the microchannel 104. In the case where the specimen is blood, the specimen in the microchannel 104 is separated into plasma and serum by centrifugal separation, and a specific amount of plasma is held in the microchannel 104 at the extraction section 110. Accordingly, by cutting off the extraction section 110 from the microsampling device 100 after centrifugal separation is performed, the plasma in the specimen may be extracted by a specific amount. The specific amount is, for example, 5.6 µL (or half the amount, i.e., 2.8 µL).

Figure 3B:
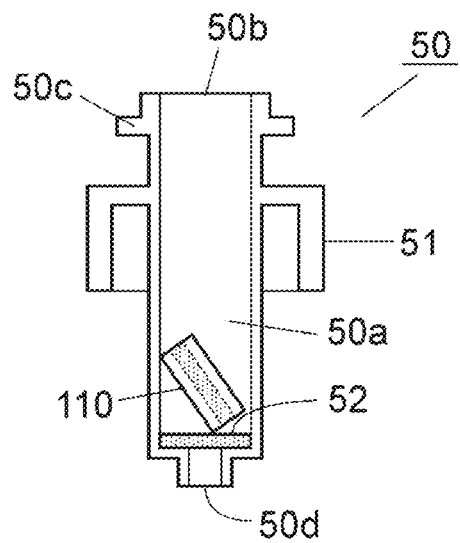
FIG. 3B is a diagram showing the separation device housing a part (specimen holding member) of the micro-sampling device.

As shown in FIG. 3B, the extraction section 110 (hereinafter referred to also as "specimen holding member 110") that is cut off from the microsampling device 100 is placed inside the separation device 50 and is placed at the pretreatment container placement section 12. As a result pretreatment such as an extraction process of extracting a specimen from the extraction section 110 is automatically performed.

Figure 13:
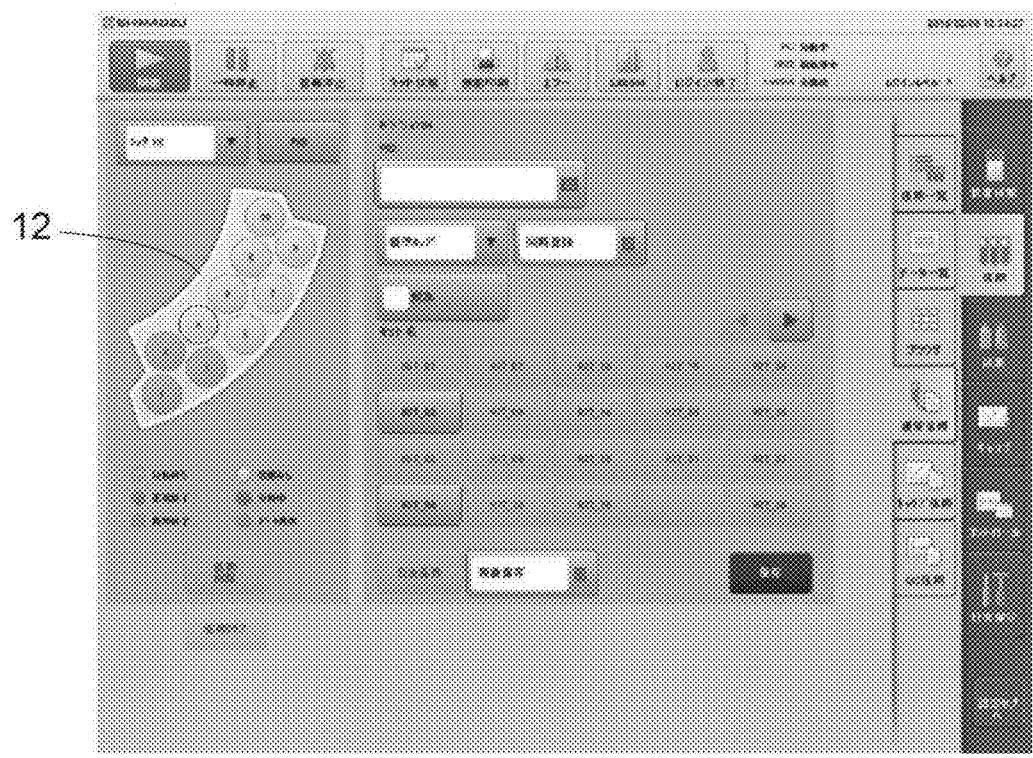
FIG. 13 is an image view showing an example of a screen for setting an placing position of a pretreatment container (separation device) housing a specimen holding member.
Figure 14:
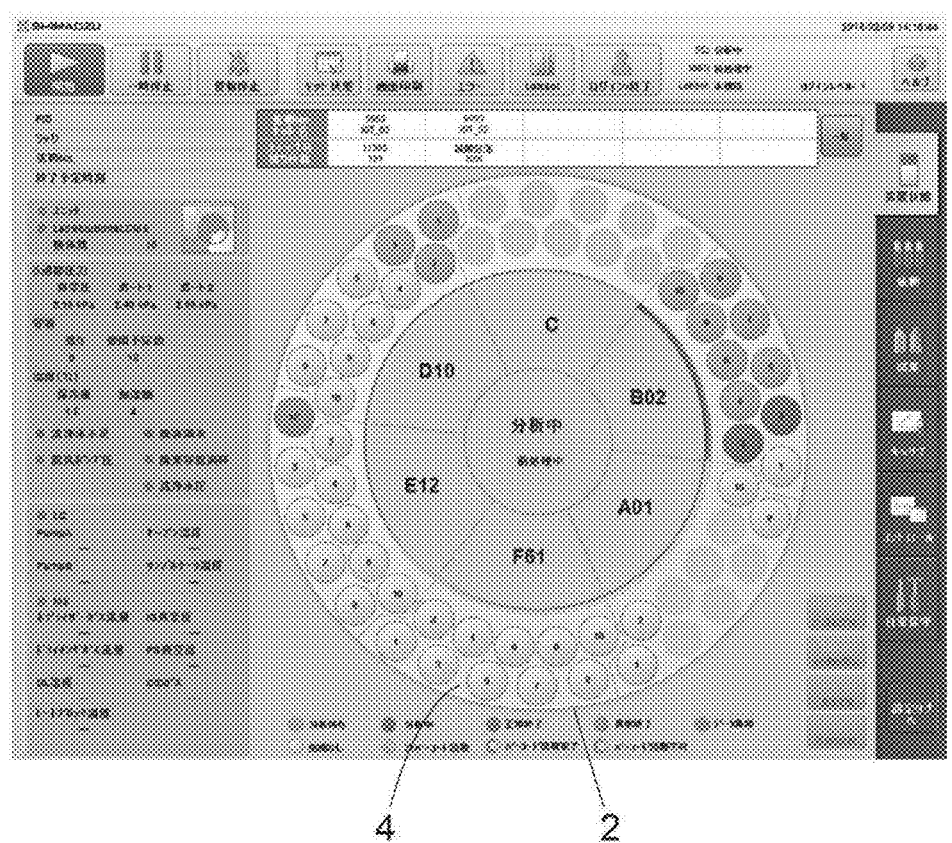
FIG. 14 is an image view showing an example of a screen for setting a placing position of a specimen container containing a normal specimen.

At the time of placing the separation device 50 housing the extraction section 110 at the pretreatment container placement section 12, an analyst inputs and registers, on a screen, for example, shown in FIG. 13, the position at the pretreatment container placement section 12 where the separation device 50 is to be placed, together with information about the specimen held in the extraction section 110. Additionally, with respect to a normal specimen, or in other words, a specimen which is not held in the specimen holding member such as the extraction section 110, the analyst inputs, and registers in the device, the position where the specimen is to be placed, together with information about the specimen, by using, for example, a screen shown in FIG. 14. On the device side, the position of the specimen container 6 or the separation device 50 containing a specimen is identified at the time of performing pretreatment on the specimen, based on the information registered by the analyst, and a pretreatment item specified by the analyst is performed on the specimen in the specimen container 6 or the separation device 50. Details of a pretreatment operation will be given later.

Additionally, a specimen may be extracted from the extraction section 110 of the microsampling device 100 into the specimen container 6 by housing the extraction section 110 in the specimen container 6 and shaking the specimen container 6 by an appliance, such as a centrifuge, separate from the pretreatment apparatus 1, and the specimen container 6 may be placed at the specimen placing section 2. Pretreatment of a specimen sampled by the microsampling device 100 may thereby be performed in the same manner as for a normal specimen.

The separation device 50 and the collection container 54 forming the pretreatment container will be described with reference to FIGS. 2A, 2B, 2C, and 2D.

Figure 2A:
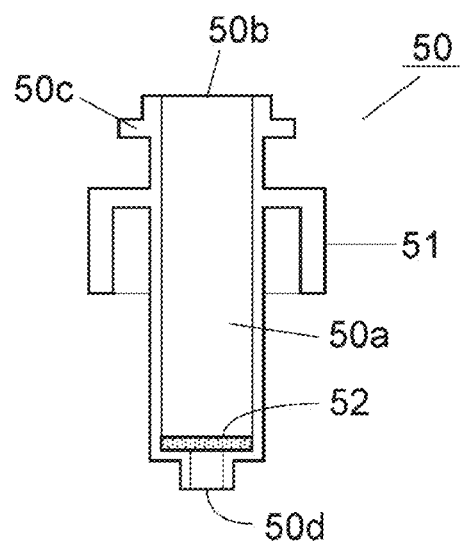
FIG. 2A is a cross-sectional view showing an example of a separation device of a pretreatment container.

As shown in FIG. 2A, the separation device 50 is a cylindrical container having an inner space 50a for containing a specimen or a reagent. A separation layer 52 is provided at a bottom of the inner space 50a. The separation layer 52 is a separation agent or a separation membrane having a function of selectively separating a specific component in a specimen by allowing the specimen to pass through and physically or chemically reacting with the specific component. As the separation agent which forms the separation layer 52, an ion-exchange resin, a silica gel, cellulose, activated carbon, or the like may be used. As the separation membrane, a poly-tetrafluoroethylene (PTFE) membrane, a nylon membrane, a polypropylene membrane, polyvinylidene-difluoride (PVDF) membrane, an acrylic copolymer membrane, a mixed cellulose membrane, a nitrocellulose membrane, a polyether-sulfone membrane, an ion-exchange membrane, a glass-fiber membrane, or the like may be used.

As a deproteinizing filter (separation membrane) for removing protein in a specimen by filtration, PTFE, an acrylic copolymer membrane, or the like may be used. In this case, a prefilter 52*b* may be provided on an upper side of a deproteinizing filter 52*a* in order to prevent clogging of the deproteinizing filter, as shown in FIG. 2D. As the prefilter 52*b*, a nylon membrane, a polypropylene membrane, a glass fiber membrane, or the like may be used. The prefilter 52*b* is for removing an insoluble substance or a foreign substance having a relatively large particle size from the specimen, and may prevent the deproteinizing filter 52*a* from being clogged with an insoluble substance or a foreign substance having a relatively large particle size.

An opening 50*b* for injecting a specimen or a reagent is provided on an upper surface of the separation device 50, and an extraction port 50*d* for extracting a liquid which passed through the separation agent 52 is provided on a lower surface of the separation device 50. A flange portion 50*c* protruding in a circumferential direction is provided on an upper part of an outer circumferential surface to be engaged with the holding section 25 of the carrying arm 24 described later.

A skirt portion 51 which protrudes in the circumferential direction, extends downward by a specific distance, and surrounds an outer circumferential surface is provided below the flange portion 50*c*. As described later, the skirt portion 51 comes into close contact with an edge of a filter port 30 of a processing section 28 when housed in the filter port 30 together with the collection container 54, so as to form a sealed space in the skirt portion 51.

Figure 2B:
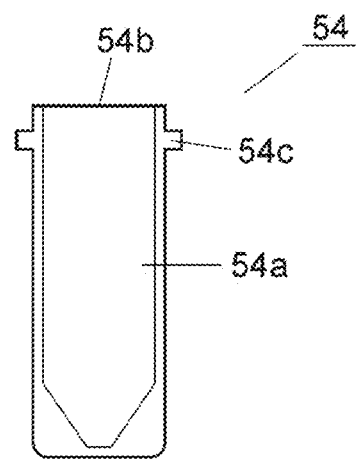
FIG. 2B is a cross-sectional view showing an example of a collection container of the pretreatment container.
Figure 2C:
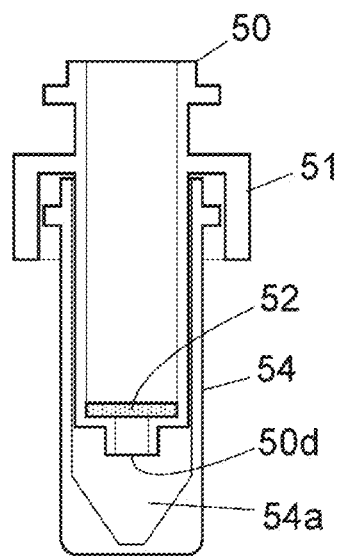
FIG. 2C is a cross-sectional view showing the pretreatment container in a state where the collection container is attached to the separation device.
Figure 2D:
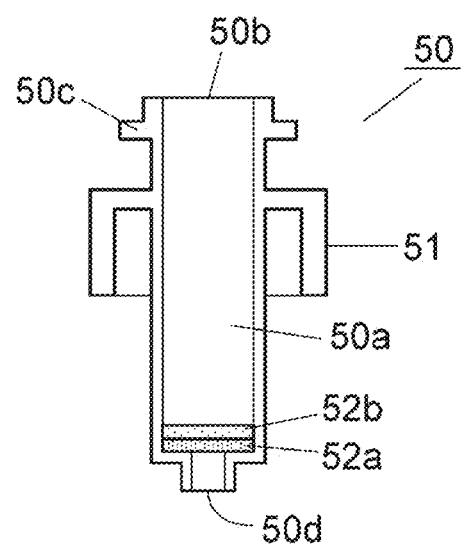
FIG. 2D is a cross-sectional view showing another example of the separation device.

As shown in FIGS. 2B and 2C, the collection container 54 is a cylindrical container which houses a lower portion of the separation device 50, and which collects extracted liquid which is extracted from the extraction port 50*d* of the separation device 50. An opening 50*b* where the lower portion of the separation device 50 is to be inserted is provided on an upper surface, and a space 54*a* for housing a part of the separation device 50, below the skirt portion 51 is provided on an inside. Like the separation device 50, a flange portion 54*c* protruding in a circumferential direction is provided at an upper part of an outer circumferential surface to be engaged with the holding section 25 of the carrying arm 24. The flange portion 54*c* has a same shape and a same outer diameter as the flange portion 50*c* of the separation device 50. The holding section 25 of the carrying arm 24 may hold the flange portion 50*c* of the separation device 50 and the flange portion 54*c* of the collection container 54 in the same manner.

An upper portion of the collection container 54 enters inside the skirt portion 51 when attached to the separation device 50. An outer diameter of the separation device 50 and an inner diameter of the collection container 54 are designed in such a way that, when the separation device 50 is housed in the inner space 54*a* of the collection container 54, a small gap is formed between an outer circumferential surface of the separation device 50 and an inner circumferential surface of the collection container 54. The separation device 50 and the collection container 54 are placed at the pretreatment container placement section 12, with a lower portion of the separation device 50 housed in the collection container 54 (i.e., a state shown in FIG. 2C).

Referring back to FIG. 1, the pretreatment apparatus 1 will be described. As ports of a pretreatment section for housing the pretreatment containers and performing specific pretreatment items, filter ports 30, stirring ports 36*a*, temperature adjustment ports 38 for the separation devices 50, and temperature adjustment ports 40 for the collection containers 54 are provided. The filter ports 30 are provided at two positions on an inner side of the pretreatment container placement section 12. Three stirring ports 36*a* are provided at a stirring section 36 provided near the pretreatment container placement section 12. The temperature adjustment ports 38, 40 are arranged on an arc. A dilution port 41 is provided next to a temperature adjustment port 40.

A negative pressure applying mechanism 55 (see FIG. 4C and FIG. 5) is connected to the filter port 30 to apply a negative pressure to a pretreatment container that is placed in the filter port 30. The filter port 30 and the negative pressure applying mechanism 55 form the pretreatment section for performing filtration of a specimen as pretreatment. The stirring section 36 also forms the pretreatment section. The stirring section 36 includes a mechanism for causing each of the stirring ports 36*a* to individually and periodically operate in the horizontal plane, and stirs a specimen solution in the separation device 50 placed in each stirring port 36*a*. Each of temperature adjustment ports 38 and 40 also form the pretreatment section, and are provided in a thermally conductive block, a temperature of which is controlled by a heater and a Peltier device, and adjusts a temperature of the separation device 50 or the collection container 54 to a specific temperature by housing the separation device 50 or the collection container 54.

The filter port 30 will be described with reference to FIGS. 4A, 4B, 4C, and 4D.

The filter port 30 is a recessed portion for housing the pretreatment container. As shown in FIG. 4D, the collection container 54 is first housed in the filter port 30, and then, the lower portion of the separation device 50 is housed in the inner space 54*a* of the collection container 54.

Inside the filter port 30, a collection container holding member 31 for holding the collection container 54 at a center by sandwiching the collection container 54 and equally pressing the collection container 54 from two opposing directions (see FIGS. 4B and 4D) are provided. The collection container holding member 31 is a U-shaped metal member which is open at a top, and forms two flat springs that are configured in such a way that two arms extending upward are elastically displaced in an inner diameter direction of the filter port 30. The two flat spring parts of the collection container holding member 31 are curved or bent inward in such a way that a space is smallest between parts between upper end portions and lower end portions. The space between the two flat spring parts is greater than an outer diameter of the collection container 54 at the upper end portions and the lower end portions, and is smaller than the outer diameter of the collection container 54 at the parts where the space is the smallest. With such a shape of the collection container holding member 31, when the collection container 54 is inserted into the filter port 30, the two flat spring parts of the collection container holding member 31 open as the collection container 54 is lowered, and the collection container 54 is held at the center of the filter port 30 by an elastic force of the flat spring parts. The collection container holding member 31 is fixed inside the filter port 30, and is not lifted together with the collection container 54 at the time of removal of the collection container 54.

A ring-shaped sealing member 60 having elasticity is provided at an edge of an opening on an upper surface of the filter port 30. The sealing member 60 is fitted in a recess provided around the edge of the opening on the upper surface of the filter port 30. A material of the sealing member 60 is an elastic material such as silicone rubber or ethylene-propylene-diene (EPDM) rubber. When the collection container 54 and the separation device 50 are placed in the filter port 30, a lower end of the skirt portion 51 of the separation device 50 abuts against the sealing member 60, and a space surrounded by an inner side surface of the skirt portion 50 and an inner side surface of the filter port 30 is sealed.

Figure 4A:
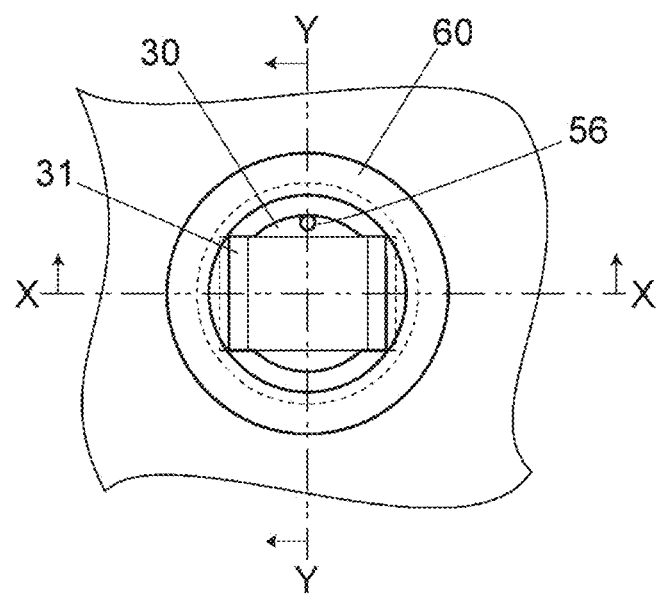
FIG. 4A is a plan view showing a filter port.
Figure 4B:
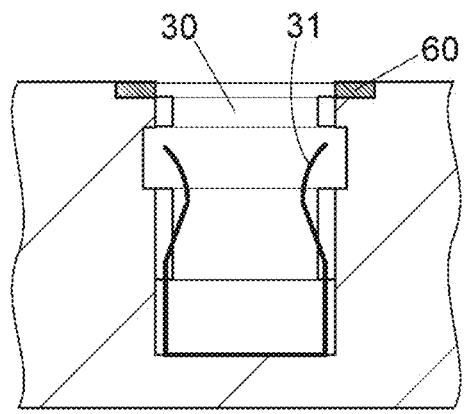
FIG. 4B is a cross-sectional view showing a cross-section along X-X in FIG. 4A.
Figure 4C:
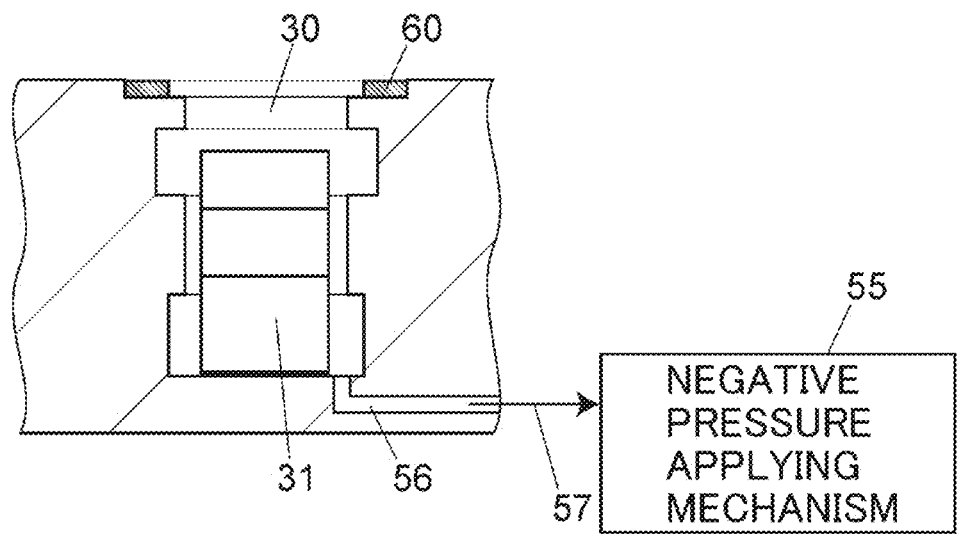
FIG. 4C is a cross-sectional view showing a cross-section along Y-Y in FIG. 4A.
Figure 4D:
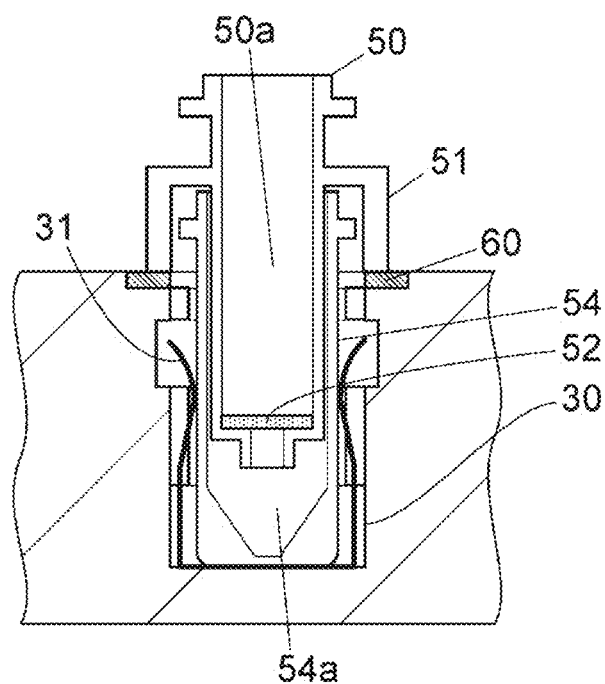
FIG. 4D is a cross-sectional structural view showing a state where the pretreatment container is placed in the filter port.

A flow path 56 for decompression communicates with a bottom surface of the filter port 30 (see FIGS. 4A and 4C). A flow path 57 of the negative pressure applying mechanism 55 is connected to the flow path 56. Although a specific structure of the negative pressure applying mechanism 55 will be described later, the negative pressure applying mechanism 55 applies a negative pressure to the filter port 30 side by a vacuum pump.

Pressure inside the filter port 30 is reduced by the negative pressure applying mechanism 55 in a state where the separation device 50 and the collection container 54 are housed in the filter port 30, and the space surrounded by the inner side surface of the skirt portion 50 and the inner side surface of the filter port 30 is thereby placed in a negative pressure state. The inner space 54a of the collection container 54 communicates with the space, which is placed in the negative pressure state. Because the upper surface of the separation device 50 is open to air, a pressure difference is caused between the inner space 50a of the separation device 50 and the inner space 54a of the collection container 54 with the separation agent 52 interposed therebetween, and only a component, in a sample solution contained in the inner space 50a of the separation device 50, which is allowed to pass through the separation agent 52 is extracted into the inner space 54a of the collection container 54 by the pressure difference.

Figure 5:
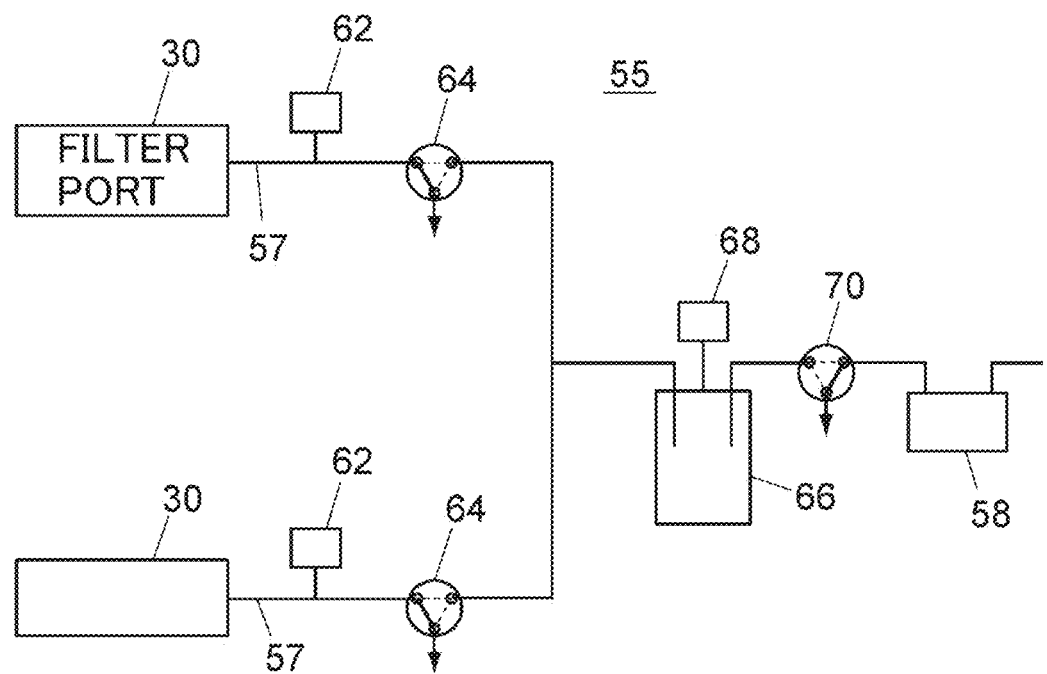
FIG. 5 is a schematic flow-path structural view showing a structure of a negative pressure applying mechanism.

An example of the negative pressure applying mechanism 55 is shown in FIG. 5.

The two filter ports 30 are connected to a common vacuum tank 66. The flow path 57 connecting the respective filter port 30 and the vacuum tank 66 includes a pressure sensor 62 and a three-way valve 64. Pressure of the filter port 30 is detected by the pressure sensor 62. The three-way valve 64 may select a state where the filter port 30 and the vacuum tank 62 are connected, a state where the filter port 30 side of the flow path 57 is open to air (a state shown in the drawing), or a state where an end portion of the flow path 57 on the filter port 30 side is sealed.

The vacuum tank 66 is connected to a pressure sensor 68, and is also connected to a vacuum pump 58 via a three-way valve 70, which enables the vacuum pump 58 to connect to the vacuum tank 66 as necessary to adjust pressure inside the vacuum tank 66.

At the time of an extraction process of a specimen at one of the filter ports 30, the filter port 30 and the vacuum tank 66 are connected, and adjustment is performed in such a way that a value of the pressure sensor 62 detecting the pressure of the filter port 30 reaches a predetermined value, and then, the end portion of the flow path 57 on the filter port 30 side is sealed. The filter port 30 thereby becomes a sealed system, an inside of the filter port 30 is maintained in a decompressed state, and a specimen is extracted.

Figure 6A:
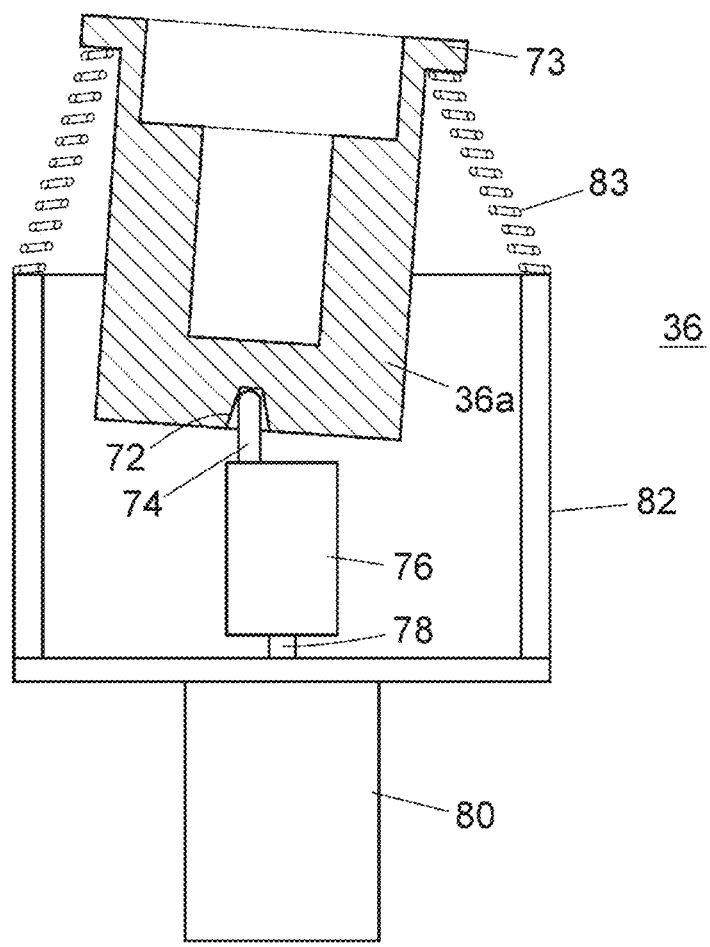
FIG. 6A is a cross-sectional structural view showing a structure of a stirring section.

Next, a structure of the stirring section 36 will be described with reference to FIGS. 6A and 6B. FIGS. 6A and 6B show one stirring port 36a of the stirring section 36.

The stirring port 36a of the stirring section 36 is a container for housing the separation device 50. The stirring port 36a is driven by a stirring mechanism provided below the stirring port 36a.

The stirring mechanism for driving the stirring port 36a will be described. A rotor 76 is placed below the stirring port 36a, and a drive shaft 74 which is vertically placed is attached on an upper surface of the rotor 76, at a position shifted from a center. An upper end of the drive shaft 74 is inserted in a support hole 72 provided on a lower surface of the stirring port 36a. The rotor 76 is supported by a rotation shaft 78 which is rotated by a motor 80, and the rotor 76 rotates by being driven by the motor 80. The drive shaft 74 is thereby caused to circle in the horizontal plane.

A support frame 82 is attached to the motor 80. The support frame 82 includes a side wall extending vertically upward from the motor 80 side, and one end of an elastic member 83, such as a coil spring, is attached to an upper end of the side wall, for example. The other end of the elastic member 83 is attached to an outer surface of an upper portion of the stirring port 36a, and elastically holds the upper portion of the stirring port 36a. The elastic member 83 is provided at each of a plurality of positions (such as four positions) around the stirring port 36a while being evenly spaced apart.

As shown in FIG. 6B, when the separation device 50 containing a sample and a reagent is housed in the stirring port 36a and the motor 80 is driven, the drive shaft 74 circles in the horizontal plane, and a lower end portion of the stirring port 36a is thereby caused to turn. Stirring is thus performed inside the separation device 50 which is housed in the stirring port 36a, and the specimen and the reagent are mixed.

The stirring port 36a also functions as a shaking port for performing a shaking process of the separation device 50 housing the specimen holding member 110. When the separation device 54 housing the specimen holding member 110 holding a specimen, as shown in FIG. 3B, is housed in the stirring port 36a, and the lower end portion of the stirring port 36a is caused to turn at a predetermined speed, a centrifugal force acts on the specimen in the specimen holding member 110, and the specimen in the specimen holding member 110 is extracted into the separation device 50. A driving speed of the motor 80 at the time of the shaking process is set to such a speed at which a specimen in the specimen holding member 110 is extracted into the separation device 50 by a centrifugal force.

Referring back to FIG. 1, the pretreatment apparatus 1 includes, at a side edge of a housing, a sample transfer apparatus 42 for transferring, as a sample, a component which is extracted into the collection container 54 by filtration at the filter port 30, to a sample injection device (such as an autosampler) placed adjacent to the pretreatment apparatus 1. The sample transfer apparatus 42 includes a movement section 44 which is moved in one direction (a direction of an arrow in FIG. 1) in the horizontal plane by a drive mechanism including a rack and pinion mechanism. A transfer port 43 for placing the collection container 54 containing a sample is provided on an upper surface of the movement section 44.

When transfer of a sample to the sample injection device side is not being performed, the transfer port 43 is placed at a position on the track of the holding section 25 of the carrying arm 24 (i.e., a position indicated by a solid line in the drawing), and placing of the collection container 54 in the transfer port 43 and collection of the collection container 54 from the transfer port 43 are performed by the carrying arm 24 at this position.

At the time of transfer of a sample to the sample injection device side, the collection container 54 containing the sample is placed in the transfer port 43, and then, the movement section 44 moves to an outer side of the pretreatment apparatus 1, and the transfer port 43 is placed at a position on the side of the adjacent sample injection device (i.e., a position indicated by a broken line in the drawing). At this position, a sampling nozzle provided at the sample injection device sucks in the sample in the collection container 54. When suction of the sample by the sample injection device is complete, the movement section 44 returns to an original position (the position indicated by the solid line in the drawing), and the collection container 54 is collected by the carrying arm 24. The used collection container 54 is carried by the carrying arm 24 to a disposal port 34 to be disposed of.

The disposal port 34 for disposing of the used separation device 50 and collection container 54 is provided at a position near the dispensing port 32, on the track of the holding section 25 of the carrying arm 24. A cleaning port 45 for cleaning the sampling nozzle 20a is provided at a position along the track of the sampling nozzle 20a. Although not shown, a cleaning port for cleaning the probe 27 is provided at a position along the track of the probe 27.

Figure 7:
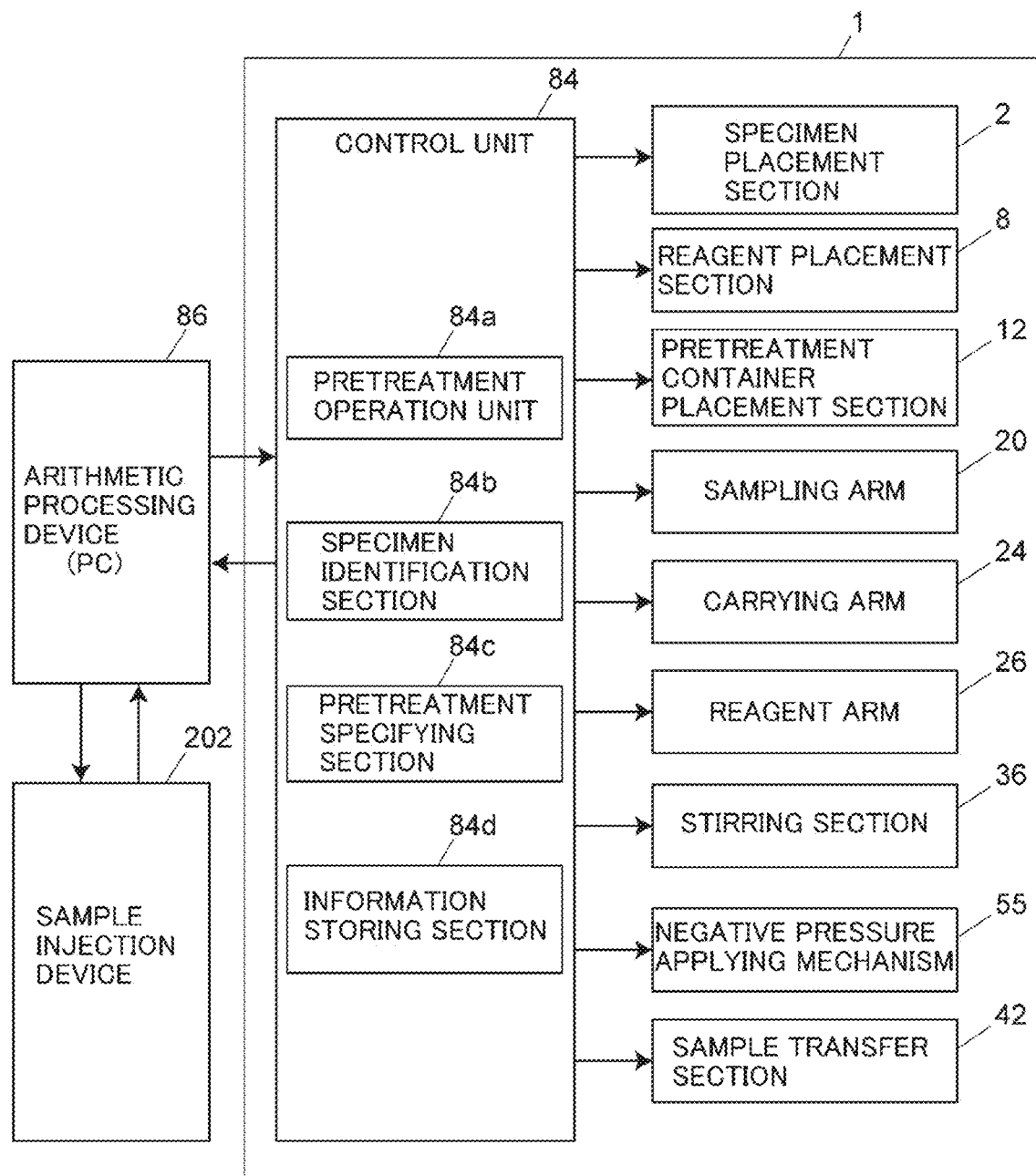
FIG. 7 is a block diagram showing a control system of the present embodiment.

Next, a control system of the pretreatment apparatus 1 will be described with reference to FIG. 7. In the following description, a "port" refers to the filter port 30 where the separation device 50 and/or the collection container 54 are placed, the dispensing port 32, the stirring port 36a, the temperature adjustment ports 38, 40, or the transfer port 43.

Operations of the specimen placing section 2, the reagent placing section 8, the pretreatment container placement section 12, the sampling arm 20, the carrying arm 24, the reagent arm 26, the stirring section 36, the sample transfer apparatus 42, and the negative pressure applying mechanism 55, which are provided in the pretreatment apparatus 1, are controlled by a control unit 84. The control unit 84 is implemented by a computer provided in the pretreatment apparatus 1 and software executed by the computer. For example, an arithmetic processing device 86, which is implemented by a personal computer (PC) or a dedicated computer, is connected to the control unit 84, and an analyst manages the pretreatment apparatus 1 by using the arithmetic processing device 86. A liquid chromatograph system (hereinafter "LC system") 200 (see FIGS. 11 and 12) which is arranged next to the pretreatment apparatus 1, and which performs analysis of a sample which has been subjected to pretreatment at the pretreatment apparatus 1 is electrically connected to the arithmetic processing device 86, and a sample injection device 202 provided in the LC system 200 operates in coordination with operation of the pretreatment apparatus 1. FIG. 7 shows only the sample injection device 202 in the LC system 200.

The control unit 84 includes a pretreatment operation section 84a, a specimen identification section 84b, a pretreatment container specifying section 84c, and an information storing section 84d. The pretreatment operation section 84a, the specimen identification section 84b, and the pretreatment container specifying section 84c are functions that are obtained by execution of software by an arithmetic element such as a CPU forming the control unit 84. The information storing section 84d is a function that is implemented by a partial storage area of a storage device provided in a computer forming the control unit 84.

As described above, as the specimens to be handled by the pretreatment apparatus 1 of the present embodiment, there are two types of specimens, namely, the normal specimen in the specimen container 6 placed at the specimen placing section 2, and the specimen that is held in the specimen holding member 110 (see FIG. 3B) housed in the separation device 50 placed at the pretreatment container placement section 12. Information about the specimen is registered in advance in the device by an analyst, and the control unit 84 performs necessary operations based on the registered information so as to identify a placing position of a specimen that is to be subjected to pretreatment next and a pretreatment item to be performed on the specimen, and to perform the pretreatment item.

The pretreatment operation section 84a is configured to check a processing item to be performed on each specimen next, to check availability of the port corresponding to the processing item, and if there is an available port, to carry the separation device 50 or the collection container 54 containing the specimen to the port and to perform the processing item. If there is no available port for the processing item, the target separation device 50 or collection container 54 is carried to the port as soon as the port becomes available.

The specimen identification section 84b is configured to identify, based on information that is registered in advance, whether an analysis target specimen is a normal specimen that is contained in the specimen container 6 or a specimen that is held in the specimen holding member 110 housed in the separation device 50. When the analysis target specimen is identified by the specimen identification section 84b to be a normal specimen, a pretreatment operation for a normal specimen is performed. On the other hand, when the analysis target specimen is identified by the specimen identification section 84b to be a specimen that is held in the specimen holding member 110, a pretreatment operation for a specimen that is held in the specimen holding member 110 is performed. Details of each pretreatment operation will be given later.

When the analysis target specimen is identified by the specimen identification section 84b to be a specimen that is held in the specimen holding member 110, the pretreatment container specifying section 84c specifies the position of the pretreatment container (separation device 50) where the specimen holding member 110 is housed, based on information about the specimen that is registered in advance by the analyst. As described above, information about the placing position of a pretreatment container where the specimen holding member 110 is housed is registered in the device by the analyst at the time of placing of the pretreatment container at the pretreatment container placement section 12, and is stored in the solid sample placing information storing section 84d.

Figure 8:
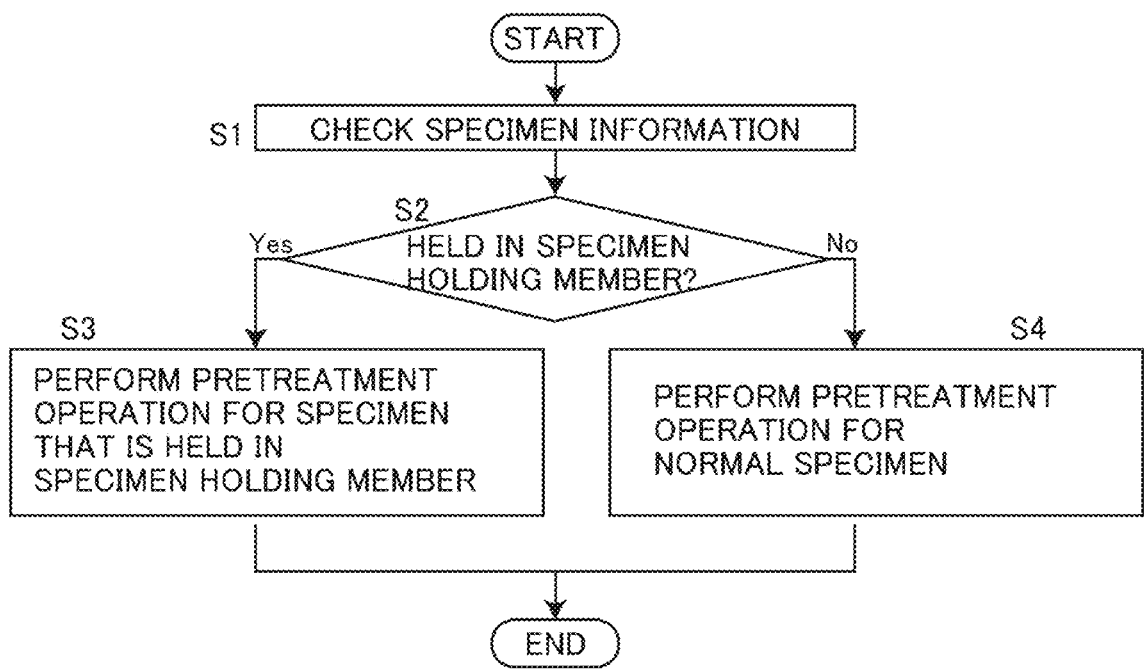
FIG. 8 is a flowchart showing an example of a specimen recognition operation performed before start of a pretreatment operation of the present embodiment.
Figure 9:
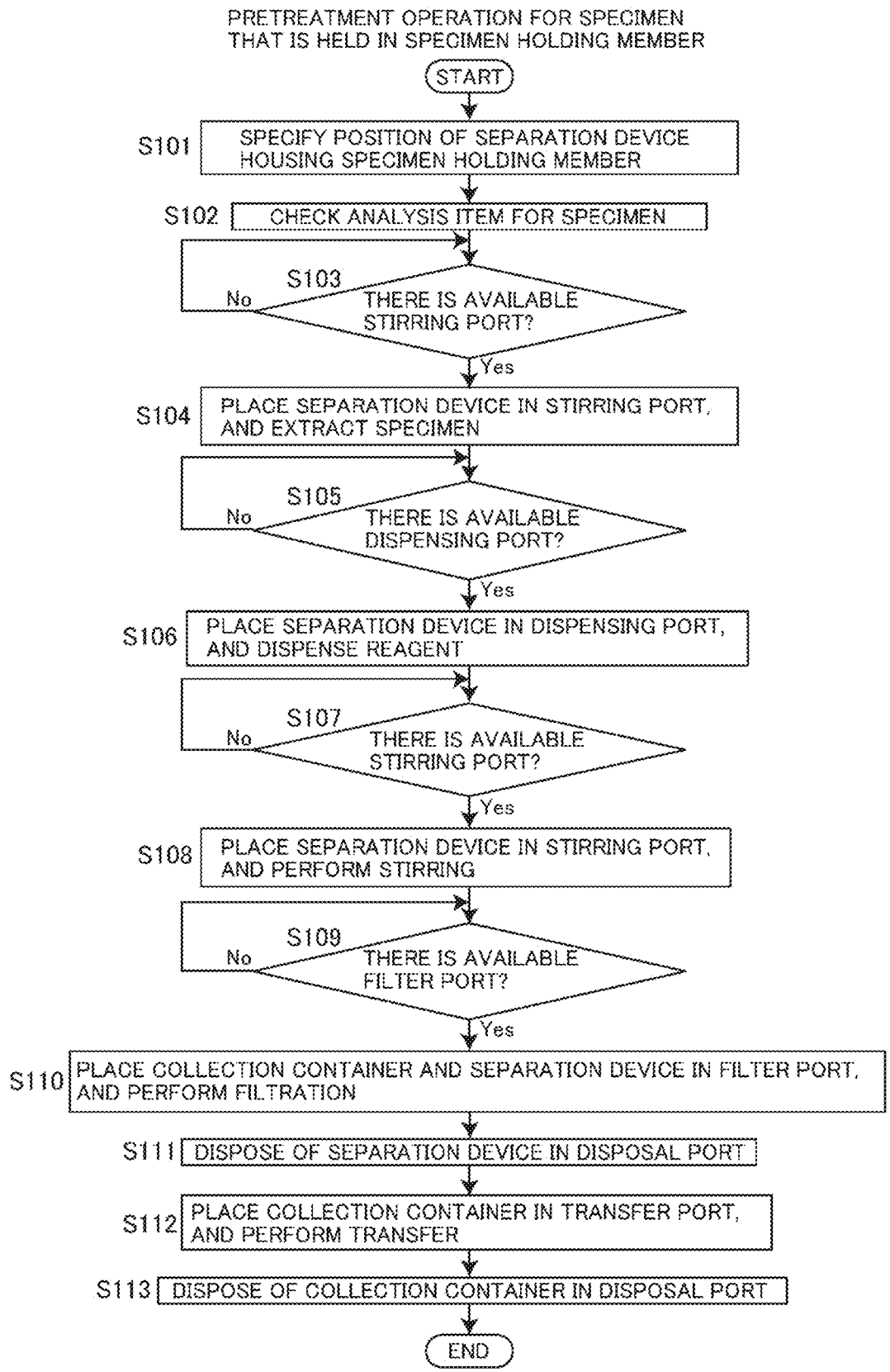
FIG. 9 is a flowchart showing an example of a pretreatment operation of the present embodiment for a solid sample.
Figure 10:
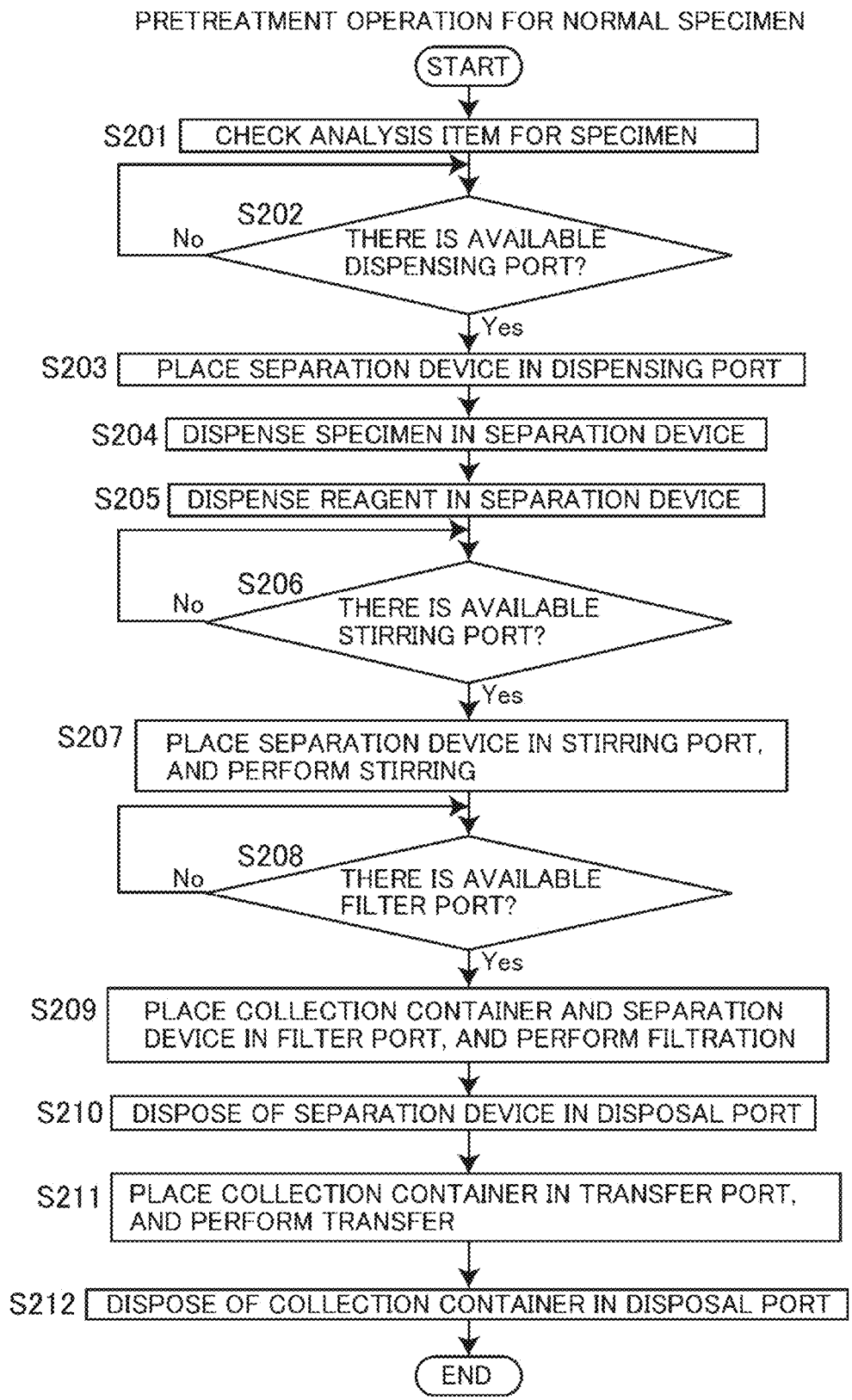
FIG. 10 is a flowchart showing an example of a pretreatment operation of the present embodiment for a fluid specimen.

An example pretreatment operation for one sample of the present embodiment will be described with reference to FIG. 1 and flowcharts in FIGS. 8, 9 and 10. The flowcharts in FIGS. 8 to 10 show only a flow of pretreatment for one specimen, and the operation of the pretreatment is performed simultaneously in parallel, but independently of, a pretreatment operation for another specimen. To "perform pretreatment simultaneously in parallel, but independently" means that even while a filtration process or a stirring process is being performed on a specimen at a port such as the filter port 30 or the stirring port 36a, the carrying arm 24 carries the separation device 50 or the collection container 54 containing another specimen to another port so that the specimen is independently treated.

First, as shown in FIG. 8, information about an analysis target specimen is checked (step S1). In the case where the specimen as the target is a specimen that is held in the specimen holding member 110 (step S2), a pretreatment operation for a specimen that is held in the specimen holding member 110 is performed (step S3). In the case where the specimen as the target is a specimen which is not held in the specimen holding member 110, or in other words, in the case where the specimen is a normal specimen that is contained in the specimen container 6 (step S2), a pretreatment operation for a normal specimen is performed (step S4).

As shown in FIG. 9, in the case where the analysis target specimen is a specimen that is held in the specimen holding member 110, the placing position of the separation device 50 housing the target specimen holding member 110 is identified (step S101), and an analysis item set for the specimen is checked (step S102).

Next, availability of the stirring ports 36a is checked (step S103), and if there is an available stirring port 36a, the target separation device 50 is carried by the carrying arm 24 and placed in the stirring port 36a, and the shaking process is performed on the separation device 50 (step S104). The specimen that is held in the specimen holding member 110 is thereby extracted into the separation device 50. The separation device 50 and the collection container 54 are placed at the pretreatment container placement section 12 in a stacked state (state shown in FIG. 2C), but the carrying arm 24 holds only the separation device 50 on top by the holding section 25, and carries the separation device 50 to the dispensing section 32.

After the specimen is extracted into the separation device 50 by the shaking process, the availability of the dispensing port 32 is checked (step S105), and if the dispensing port 32 is available, the separation device 50 into which the specimen is extracted is placed in the dispensing port 32 by the carrying arm 24, and a predetermined reagent is dispensed into the separation device 50 (step S106).

After a predetermined reagent is dispensed into the separation device 50, the availability of the stirring ports 36a is checked (step S107), and if there is an available stirring port 36a, the separation device 50 is carried from the dispensing port 32 by the carrying arm 24 and is placed in the stirring port 36a. Stirring is performed inside the separation device 50 (step S108).

Next, availability of the filter ports 30 is checked (step S109), and if there is an available filter port 30, a collection container 54 is placed in the filter port 30 by the carrying arm 24, and the separation device 50 is placed on the collection container 54 (step S110). The collection container 54 that is placed in the filter port 30 is a collection container 54 which is paired with the target separation device 50. In the filter port 30, the lower portion of the separation device 50 is housed inside the collection container 54 (state shown in FIG. 4D).

At the time of a filtration process at the filter port 30, the separation device 50 is pushed downward (toward the filter port 30) by the carrying arm 24, and the lower end of the skirt portion 51 of the separation device 50 is lowered to a height that is slightly lower (by about 0.1 mm, for example) than a height of an upper surface of the sealing member 60 provided around the filter port 30. The lower end of the skirt portion 51 of the separation device 50 thus squashes the sealing member 60, and airtightness between the lower end of the skirt portion 51 and the sealing member 60 is increased. The carrying arm 24 maintains the state where the separation device 50 is pushed downward, until the filtration process described below is started and inside of the filter port 30 reaches a negative pressure state.

The filtration process is started in a state where the separation device 50 is placed on the collection container 54 in the filter port 30, and the filter port 30 is placed in an airtight state. When a state where the pressure inside the filter port 30 is reduced by the negative pressure applying mechanism 55 is maintained for a specific period of time, a solution inside the separation device 50 is filtered, and the specimen is extracted into the collection container 54.

When the filtration process is complete, the used separation device 50 is carried to the disposal port 34 by the carrying arm 24 and is disposed of (step S111). Furthermore, availability of the transfer port 43 is checked, and if the transfer port 43 is available, the collection container 54 is placed in the transfer port 43 by the carrying arm 24, and the collection container 54 is transferred by the transfer apparatus 42 to the LC system 200 (see FIGS. 11 and 12), which is arranged adjacent to the pretreatment apparatus 1 (step S112). When the collection container 54 is placed in the transfer port 43, the movement section 44 moves to the position on the side of the sample injection device 202 (i.e., the position indicated by the broken line in FIG. 1) provided in the LC system 200, which is adjacently arranged, and the collection container 54 is thereby transferred to the side of a sample suction device 90.

On the sample injection device 202 side, the specimen is sucked in by a sampling nozzle from the collection container 54 transferred by the transfer apparatus 42. The movement section 44 stays at the position on the side of the LC system 200 until suction of the specimen at the sample injection device 202 is completed, and returns to the original position (the position indicated by the solid line in FIG. 1) when a signal indicating end of suction of the specimen is received from the LC system 200 side.

When transfer of the sample is complete, the used collection container 54 is collected from the transfer port 43 by the carrying arm 24, and the collection container 54 is disposed of in the disposal port 34 (step S113).

Next, an example of a pretreatment operation for a case where the analysis target specimen is a normal specimen will be described with reference to FIG. 10.

In the case where the analysis target specimen is a normal specimen that is contained in the specimen container 6, first, an analysis item specified by the analyst in advance for the specimen is checked (step S201), and a pretreatment item necessary to perform the analysis item is determined. Whether the dispensing port 32 is available is checked, and if the dispensing port 32 is available, the carrying arm 24 takes out an unused separation device 50 for containing the specimen from the pretreatment container placement section 12, and places the separation device 50 in the dispensing port 32 (steps S202, S203). As described above, the separation device 50 and the collection container 54 are placed in the pretreatment container placement section 12 in a stacked state (state shown in FIG. 2C), and also in this case, the carrying arm 24 holds only the separation device 50 on top with the holding section 25, and carries the separation device 50 to the dispensing section 32.

The specimen is dispensed into the separation device 50 by the sampling nozzle 20a (step S204). The sampling nozzle 20a is cleaned in the cleaning port 45 after dispensing the specimen into the separation device 50 to be used for dispensing of the next specimen. A reagent according to the pretreatment to be performed on the specimen that is dispensed into the separation device 50 is collected from the reagent container 10 by a reagent dispensing nozzle 26a, and the reagent is dispensed into the separation device 50 in the dispensing port 32 (step S205). Additionally, dispensing of the reagent into the separation device 50 may be performed before dispensing of the sample.

After the specimen and the reagent are dispensed into the separation device 50, availability of the stirring ports 36a is checked (step S206). If there is an available stirring port 36a, the separation device 50 in the dispensing port 32 is placed in the available stirring port 36a by the carrying arm 24, and stirring is performed (step S207).

Subsequent operations are the same as those in steps S109 to S113 of the pretreatment operation for a specimen that is held in the specimen holding member 110. That is, availability of the filter ports 30 is checked (step S208), and if there is an available filter port 30, the collection container 54 and the separation device 50 are placed in the filter port 30 by the carrying arm 24, and the filtration process is performed (step S209).

When the filtration process for the specimen is complete, the used separation device 50 is disposed of in the disposal port 34 (step S210). Moreover, availability of the transfer port 43 is checked, and if the transfer port 43 is available, the collection container 54 is placed in the transfer port 43 by the carrying arm 24, transfer of the specimen to the sample injection device 202 is performed (step S211), and the used collection container 54 is disposed of in the disposal port 34 (step S212).

Additionally, after the filtration process for the sample is completed, a temperature process of placing the sample extracted into the collection container 54 under a specific temperature for a specific period of time is may be performed. In such a case, availability of the temperature adjustment ports 40 is checked, and if there is an available temperature adjustment port 40, the collection container 54 is placed in the available temperature adjustment port 40. Then, after a lapse of the specific period of time, the collection container 54 in the temperature adjustment port 40 is placed in the transfer port 43, and the sample is transferred.

Figure 11:
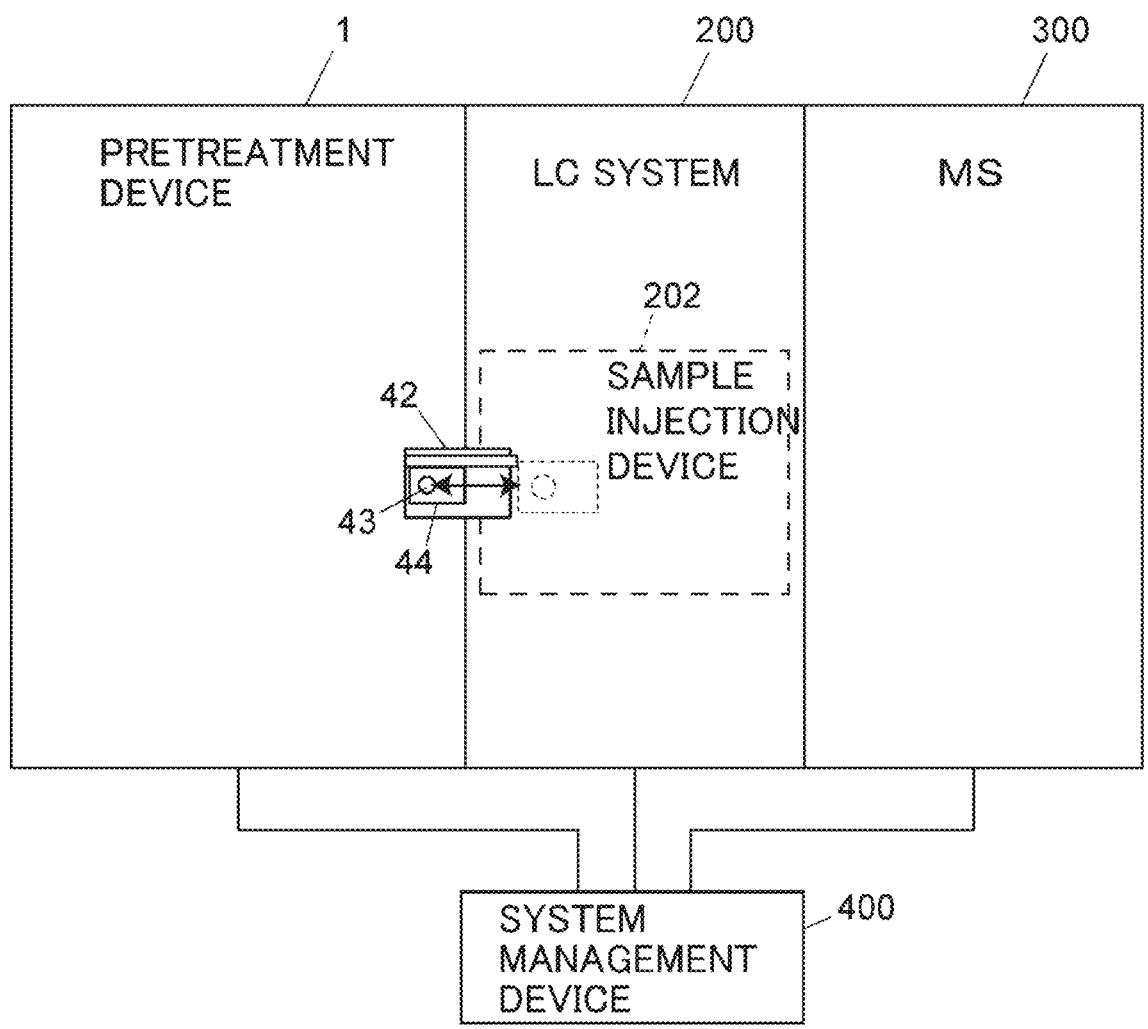
FIG. 11 is a block diagram schematically showing an embodiment of an analysis system.

Next, an embodiment of an analysis system provided with the pretreatment apparatus 1 will be described with reference to FIG. 11.

The LC system 200 is arranged adjacent to the pretreatment apparatus 1 described in the above-described embodiment, and a mass spectrometer (MS) is further arranged adjacent to the LC system 200. Operations of the pretreatment apparatus 1, the LC system 200, and an MS 300 are managed by a common system management device 400. The system management device 400 is a dedicated computer or a general-purpose personal computer including software for controlling and managing the pretreatment apparatus 1, the LC system 200, and the MS 300, and also includes the function of the arithmetic processing device 86 in FIG. 7.

The LC system 200 includes the sample injection device 202 for collecting a specimen which has been subjected to pretreatment at the pretreatment apparatus 1, and for injecting the specimen as a sample into an analysis flow path of a liquid chromatograph. As described above, the pretreatment apparatus 1 includes the transfer apparatus 42 for transferring the collection container 54 containing a specimen which has been subjected to pretreatment to the LC system 200 side, and the sample injection device 202 collects the specimen from the collection container 54 transferred by the transfer apparatus 42 to the LC system 200 side. When the movement section 44 of the transfer apparatus 42 moves to the LC system 200 side, the collection container 54 placed in the transfer port 43 of the movement section 44 is placed at a predetermined position in the sample injection device 202.

When the collection container 54 containing a specimen which has been subjected to pretreatment at the pretreatment apparatus 1 is placed in the transfer port 43 of the transfer apparatus 42, and the movement section 44 is moved to the LC system 200 side and the collection container 54 is placed at a predetermined position at the sample injection device 202, a signal to the effect is sent to the sample injection device 202 side through the system management device 400, and the sample injection device 202 starts an operation of collecting the sample from the collection container 54. The transfer apparatus 42 holds the collection container 54 at the predetermined position in the sample injection device 202 until the sample collecting operation by the sample injection device 202 is completed. When the sample collecting operation by the sample injection device 202 is completed, a signal indicating that the sample collecting operation is complete is sent to the pretreatment apparatus 1 side through the system management device 400, and the transfer apparatus 42 moves the movement section 44 to the pretreatment apparatus 1 side, and returns the collection container 54 to a predetermined position in the pretreatment apparatus 1. The collection container 54, which is returned to the pretreatment apparatus 1 side, is carried to the disposal port 34 by the carrying arm 24, and is disposed of.

Figure 12:
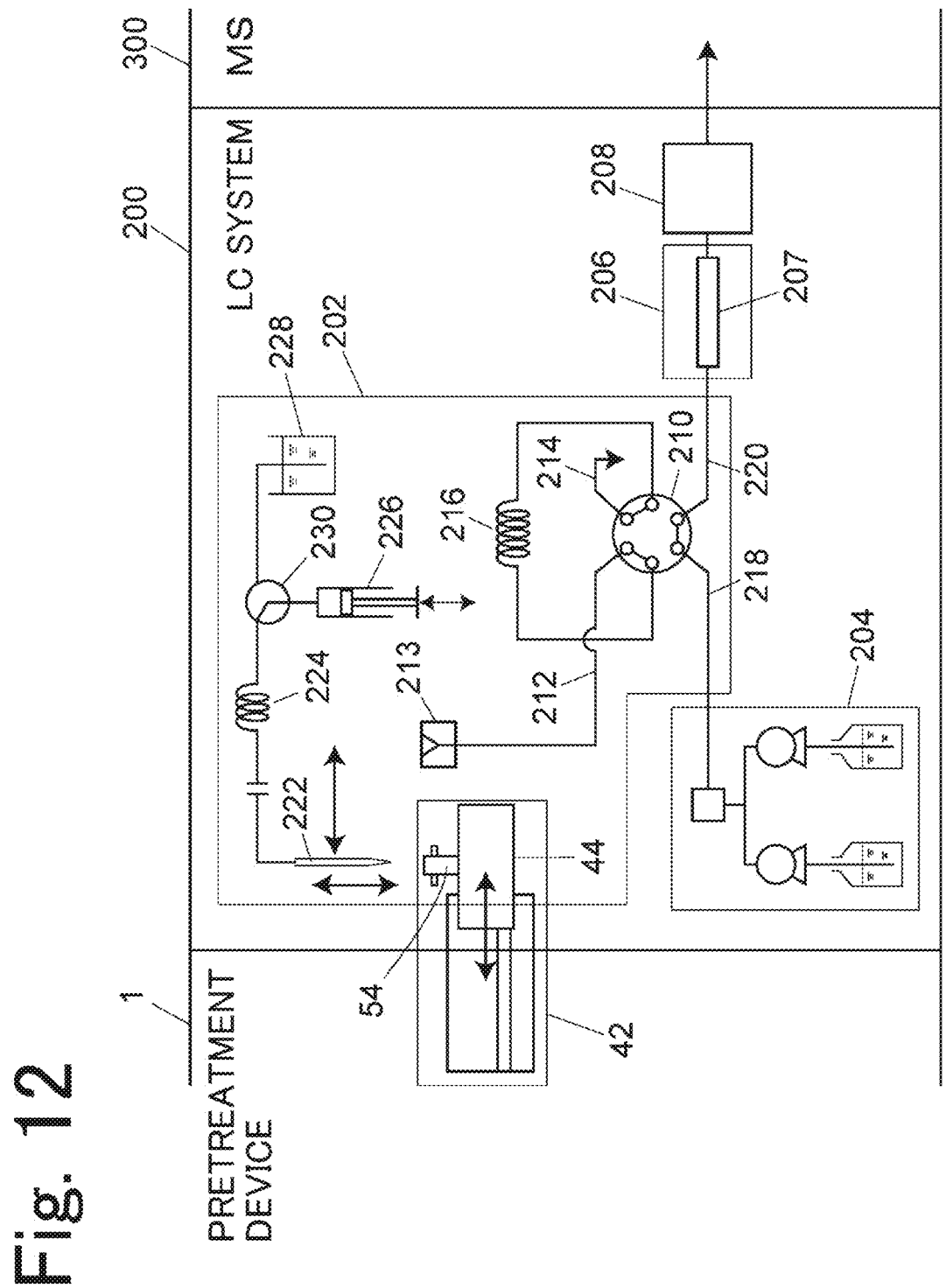
FIG. 12 is a flow-path structural view showing a structure of a liquid chromatograph system according to the present embodiment.

An example of the LC system 200 will be described with reference to FIG. 12.

In addition to the sample injection device 202, the LC system 200 includes a liquid feeding device 204, a column oven 206, and a detector 208. The liquid feeding device 204 is a device for feeding, for example, two types of solvents to a mixer by a liquid feeding pump, and for feeding a solution, which is obtained by mixing by the mixer, as a mobile phase. The column oven 206 includes an analytical column 207 for separating a sample (specimen which has been subjected to pretreatment) into components. The detector 208 is a detector such as an ultraviolet absorbance detector for detecting a sample component separated by the analytical column 207.

The liquid feeding device 204 is located on an upstream end of an upstream-side analytical flow path 218, and feeds a mobile phase through the upstream-side analytical flow path 218. The analytical column 207 and the detector 208 are provided on a downstream-side analytical flow path 220. The upstream-side analytical flow path 218 and the downstream-side analytical flow path 220 are connected to ports of a two-position valve 210 provided at the sample injection device 202, and are connected to each other through the two-position valve 210.

The two-position valve 210 of the sample injection device 202 includes six ports. In addition to the upstream-side analytical flow path 218 and the downstream-side analytical flow path 220, a sample introduction flow path 212, a drain flow path 214, and one end and the other end of a sample loop 216 are connected to the ports of the two-position valve 210. The two-position valve 210 is switched to achieve one of the following states: (1) a state where the sample introduction flow path 212, the sample loop 216, and the drain flow path 214 are connected in series, and the downstream-side analytical flow path 220 is connected immediately downstream the upstream-side analytical flow path 218 (a state shown in FIG. 12), and (2) a state where the upstream-side analytical flow path 218, the sample loop 216, and the downstream-side analytical flow path 220 are connected in series. The sample introduction flow path 212 communicates with an injection port 213.

The sample injection device 202 includes a needle 222 which is capable of injecting and discharging liquid from a tip end, and a syringe pump 226 connected to the needle 222 through a flow path. The needle 222 is moved in a horizontal direction and a vertical direction by a drive mechanism, not shown, and may collect a sample from the collection container 54, which is transferred by the transfer apparatus 42 to the LC system 200 side, and may inject the sample from the injection port 213. The syringe pump 226 is also connected to a cleaning liquid container 228 where a cleaning liquid is stored, by switching of a flow path switching valve 230. The syringe pump 228 which sucked in a cleaning liquid is connected to the needle 222, and the cleaning liquid is fed by the syringe pump 226 in a state where the needle 222 is connected to the injection port 213 to thereby clean inner surfaces of a sample loop 224, the needle 222, and the sample introduction flow path 212.

At the time of collecting a sample in the collection container 54, the tip end of the needle 22 is inserted into the collection container 54, and the sample is sucked in by the syringe pump 226 and is held in the sample loop 224 provided between the needle 222 and the syringe pump 226. The sample that is held in the sample loop 224 is injected from the injection port 213. At the time of injection of the sample from the injection port 213, the two-position valve 210 is switched to (1) the state where the sample introduction flow path 212, the sample loop 216, and the drain flow path 214 are connected in series, and the sample injected from the injection port 213 is held in the sample loop 216. Then, the two-position valve 210 is switched to (2) the state where the upstream-side analytical flow path 218, the sample loop 216, and the downstream-side analytical flow path 220 are connected in series, and the sample that is held in the sample loop 216 is introduced into the analytical column 207 by the mobile phase from the liquid feeding device 204, and the sample is separated into components at the analytical column 207. Each component separated at the analytical column 207 is detected by the detector 208, and is then introduced into the MS 300.

Signals obtained by the detector 208 and the MS 300 are captured by the system management device 400 (see FIG. 11), and arithmetic processes such as quantification and composition analysis of each component separated at the analytical column 207 are performed by software placed in the system management device 400 and hardware, such as a CPU, for executing the software.

What is claimed is:

1. A pretreatment apparatus comprising:
   a pretreatment container;
   a microsampling device which includes an inlet, a microchannel for holding a specimen sucked through the inlet, and an extraction section including a part of the microchannel in which the specimen is held, wherein the part of the microchannel has a linear shape and both ends of the part of the microchannel is opened, and the extraction section including part of the microsampling device is configured to be able to cut as a specimen holding member;
   a pretreatment container placement section where the pretreatment container is placed in a state where the specimen holding member holding the specimen is housed in the pretreatment container;
   a carrying mechanism for carrying the pretreatment container placed at the pretreatment container placement section; and
   a pretreatment section including a port where the pretreatment container carried by the carrying mechanism is placed, the pretreatment section being configured to perform pretreatment including a shaking process of shaking the pretreatment container to extract the specimen from the specimen holding member in the pretreatment container that is placed in the port.

2. The pretreatment apparatus according to claim 1, wherein
   the pretreatment container placement section is for placing an empty pretreatment container that does not contain a specimen, and
   the pretreatment apparatus further comprises
      a specimen placing section where a specimen container containing a specimen is placed separately from the pretreatment container,
      a specimen dispensing section configured to collect the specimen from the specimen container that is placed at the specimen placing section, and to dispense the collected specimen into the empty pretreatment container placed at a predetermined dispensing position, and
      a specimen identification section configured to identify whether an analysis target specimen is the specimen contained in the specimen container or the specimen held in the specimen holding member.

3. The pretreatment apparatus according to claim 2, further comprising a pretreatment operation section,
   wherein the pretreatment operation section is configured to carry the empty pretreatment container placed at the pretreatment container placement section to the dispensing position by the carrying mechanism to dispense the analysis target specimen into the pretreatment container by the specimen dispensing section, to carry the pretreatment container to the pretreatment section, and to perform predetermined pretreatment, when the analysis target specimen is identified by the specimen identification section to be the specimen contained in the specimen container, and
   wherein the pretreatment operation section is configured to carry the pretreatment container, which is housing the specimen holding member and placed at the pretreatment container placement section, to the pretreatment section by the carrying mechanism, and to perform predetermined pretreatment including the shaking process, when the analysis target specimen is identified by the specimen identification section to be the specimen held in the specimen holding member.

4. The pretreatment apparatus according to claim 3, wherein
   the pretreatment section includes a plurality of shaking ports for performing the shaking process, and
   wherein the pretreatment operation section is configured to search for an available shaking port and carries a target pretreatment container to the available shaking port by the carrying mechanism, and to perform the shaking process, when the analysis target specimen is identified by the specimen identification section to be the specimen that is held in the specimen holding member.

5. The pretreatment apparatus according to claim 2, wherein
   the pretreatment container placement section is configured for placing a plurality of the pretreatment containers, and
   the pretreatment apparatus further comprises
      an information storing section configured to store information about a position, at the pretreatment container placement section, where the pretreatment container which is housing the specimen holding member is placed, and
      a pretreatment container specifying section configured to specify the pretreatment container which is housing the specimen holding member holding the analysis target specimen based on the information stored by the information storing section, when the analysis target specimen is the specimen held in the specimen holding member.

6. An analysis system comprising:

the pretreatment apparatus according to claim 1, wherein the pretreatment apparatus is comprising a transfer apparatus which includes a transfer port where the pretreatment container containing a specimen that is previously subjected to pretreatment at the pretreatment section is placed by the carrying mechanism, the transfer apparatus being configured to transfer, to outside the pretreatment apparatus, a container that is placed in the transfer port, by moving the transfer port; and a liquid chromatograph system that is arranged adjacent to the pretreatment apparatus, wherein the liquid chromatograph system is comprising an analytical flow path where a mobile phase flows, a sample injection device for collecting a sample in the container that is moved to outside the pretreatment apparatus by the transfer apparatus, and for injecting the sample into the analytical flow path, an analytical column, arranged on the analytical flow path, for separating the sample injected by the sample injection device into each component, and a detector for detecting the components that is separated at the analytical column.

7. The pretreatment apparatus according to claim 1, wherein the microsampling device comprises cut-away parts for defining the extraction section including the part of the microsampling device to be cut off as the extraction section to define a predetermined length of at least one microchannel holding a specific amount of the specimen.

* * * * *